United States Patent
Yuan et al.

(10) Patent No.: US 9,916,132 B2
(45) Date of Patent: Mar. 13, 2018

(54) RANDOM NUMBER GENERATOR

(71) Applicant: Kabushiki Kaisha Toshiba, Minato-ku (JP)

(72) Inventors: Zhiliang Yuan, Cambridge (GB); Marco Lucamarini, Cambridge (GB); Andrew James Shields, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 116 days.

(21) Appl. No.: 14/468,490

(22) Filed: Aug. 26, 2014

(65) Prior Publication Data
US 2015/0331672 A1    Nov. 19, 2015

(30) Foreign Application Priority Data
May 19, 2014  (GB) .................................. 1408869.4

(51) Int. Cl.
| | |
|---|---|
| *G06F 1/02* | (2006.01) |
| *G06F 7/58* | (2006.01) |
| *H01S 5/065* | (2006.01) |
| *H04L 9/08* | (2006.01) |
| *H01S 5/062* | (2006.01) |

(52) U.S. Cl.
CPC ............. *G06F 7/588* (2013.01); *H01S 5/065* (2013.01); *H04L 9/0852* (2013.01); *H01S 5/0651* (2013.01); *H01S 5/06213* (2013.01)

(58) Field of Classification Search
CPC . G06F 7/58; G06F 7/582; G06F 7/588; H01S 3/06754

USPC ............ 708/250, 255, 256; 372/26; 356/450
See application file for complete search history.

(56) References Cited

U.S. PATENT DOCUMENTS

| | | | | |
|---|---|---|---|---|
| 7,284,024 | B1 * | 10/2007 | Trifonov ............... | B82Y 10/00 708/256 |
| 7,813,389 | B2 * | 10/2010 | Peng ................... | H01S 3/06754 372/26 |
| 8,930,429 | B2 * | 1/2015 | Cerf ....................... | G06F 7/588 708/255 |
| 2002/0126291 | A1 * | 9/2002 | Qian ....................... | H04J 14/02 359/577 |
| 2010/0332575 | A1 | 12/2010 | Kanter et al. | |
| 2013/0036145 | A1 * | 2/2013 | Pruneri ................... | G06F 7/588 708/191 |
| 2014/0016168 | A1 | 1/2014 | Marandi et al. | |

OTHER PUBLICATIONS

Combined Search and Examination Report dated Nov. 26, 2014 in Application No. GB1408869.4.

* cited by examiner

*Primary Examiner* — Audrey Y Chang
(74) *Attorney, Agent, or Firm* — Oblon, McClelland, Maier & Neustadt, L.L.P.

(57) ABSTRACT

A random number generation system, comprising: a light source configured to generate light pulses and a driving unit configured to drive said light source such that the phase of each light pulse has a random relationship to the phase of each subsequently generated light pulse, and such that each light pulse is generated with at least two local maxima in the temporal intensity profile.

15 Claims, 15 Drawing Sheets

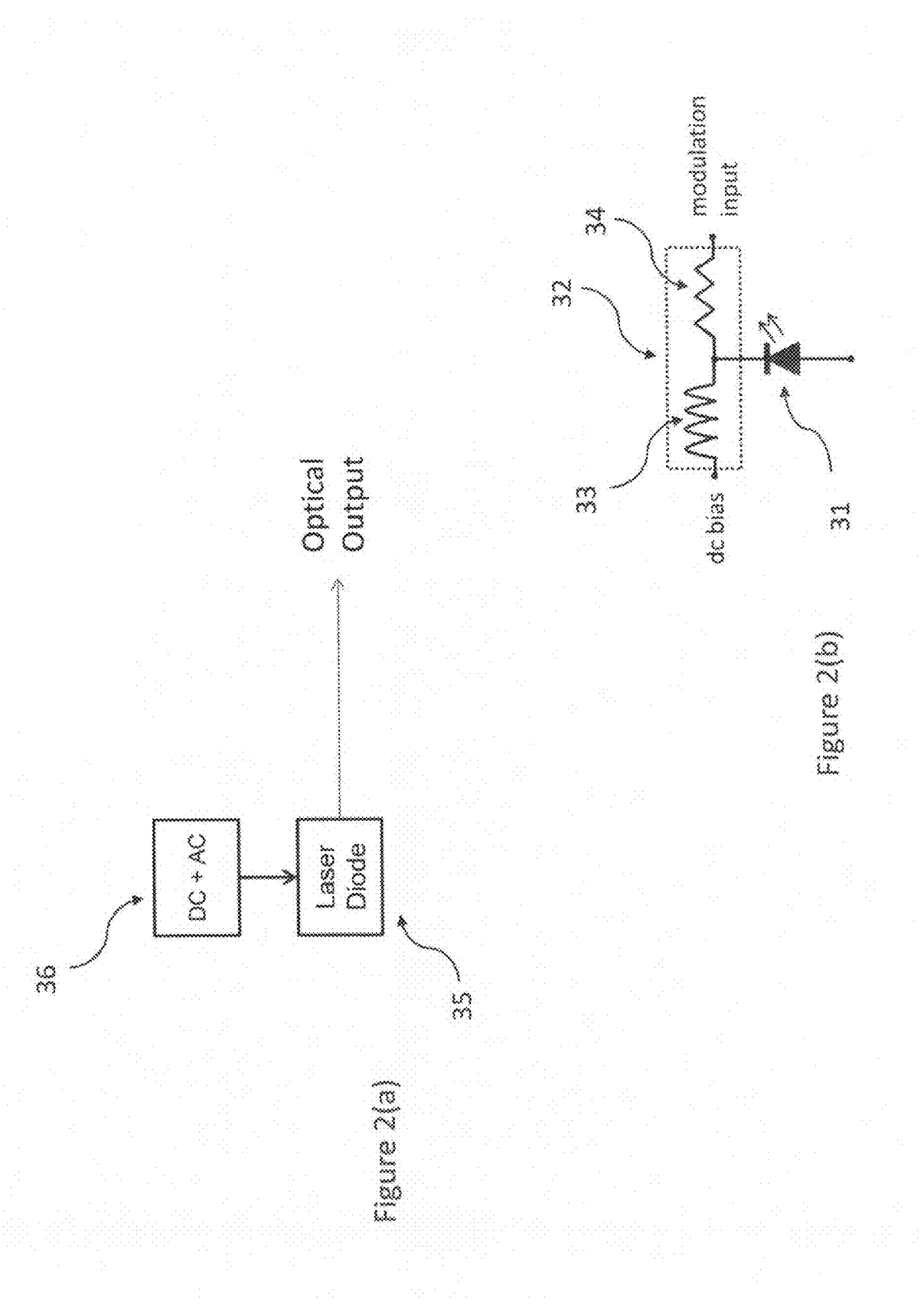

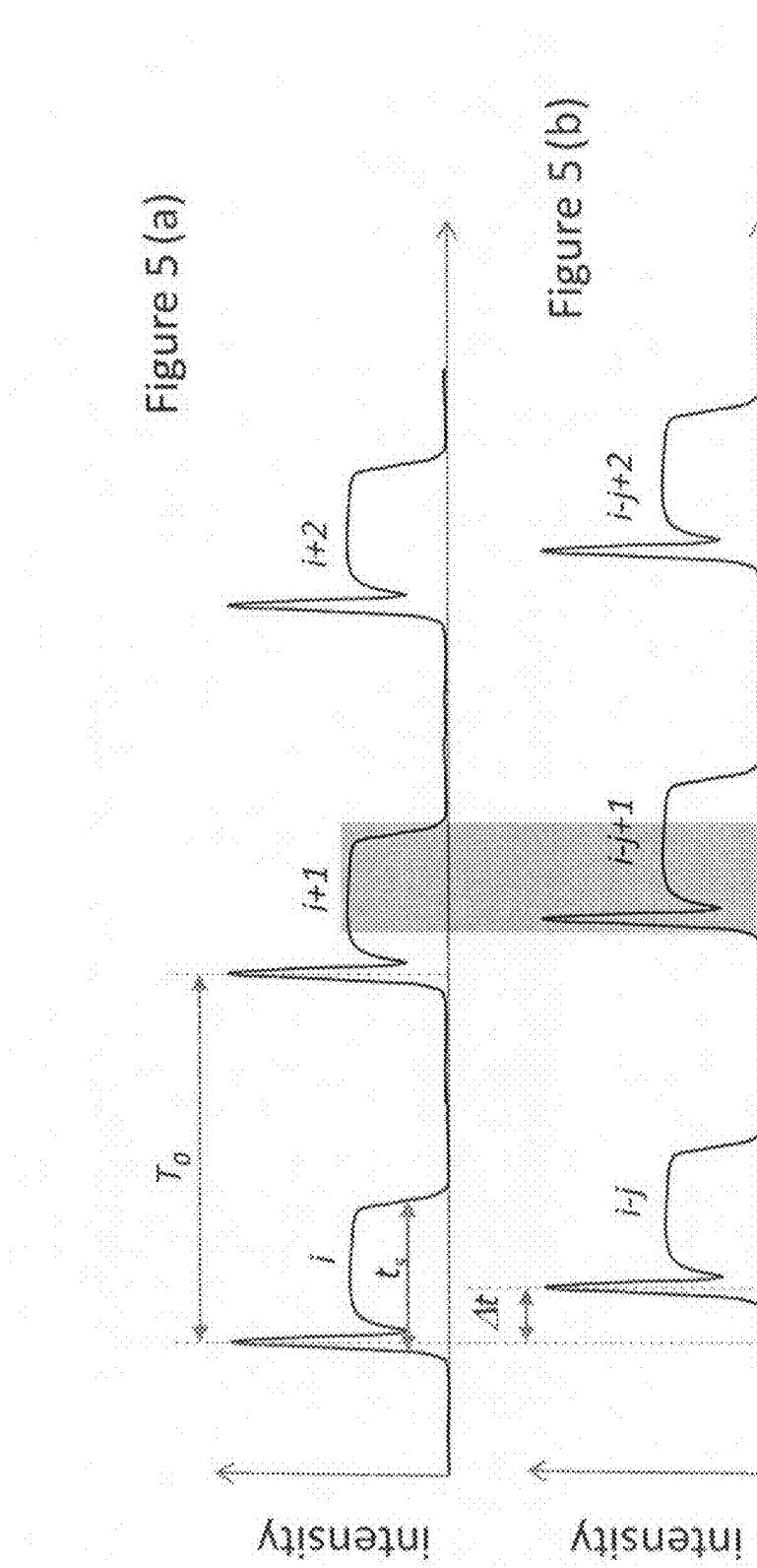

(a)

(b)

RANDOM NUMBER GENERATOR

CROSS-REFERENCE TO RELATED APPLICATIONS

This application is based upon and claims the benefit of priority from prior United Kingdom Application number 1408869.4 filed on May 19, 2014, the entire contents of which are incorporated herein by reference.

FIELD

Embodiments described herein relate generally to random number generators and random number generation methods.

BACKGROUND

Random number generators (RNGs) are important for numerous applications including medicine, cryptography (for example Quantum Key Distribution), information security, gaming, lotteries and scientific simulation. "Pseudo-RNGs" are based on computer algorithms, which eventually repeat themselves. Physical RNGs however are based on the unpredictable outcomes of physical measurements, and therefore the quality of the randomness is higher. For generators based on quantum mechanics (QRNGs), unpredictability can be derived rigorously from first principles and therefore these RNGs can offer random numbers of highest quality. The quality of randomness impacts the performance of the application. For example, for cryptography there is a need for high quality randomness in order that the cryptographic service provides strong protection.

For many applications, there is a need for a high speed real-time feed of random numbers. For example, Quantum Key Distribution (QKD) applications may require ultrafast feeds of random numbers at a rate on the order of 1-10 Gb/s.

BRIEF DESCRIPTION OF THE FIGURES

Embodiments will now be described with reference to the following figures:

FIG. 2(a) is a schematic illustration of a laser diode driven by a combination of direct current and alternating current sources;

FIG. 2(b) is a schematic illustration of part of an electrical driving circuit for a semiconductor gain-switched laser;

FIG. 5(a) shows a graph illustrating the intensity of light arriving at the output beam splitter from the short arm of an asymmetric Mach-Zehnder interferometer (AMZI) in a RNG such as that shown in FIG. 1;

FIG. 5(b) shows a graph illustrating the intensity of light arriving at the output beam splitter from the long arm of an AMZI in a RNG such as that shown in FIG. 1;

DETAILED DESCRIPTION

Figure 1:
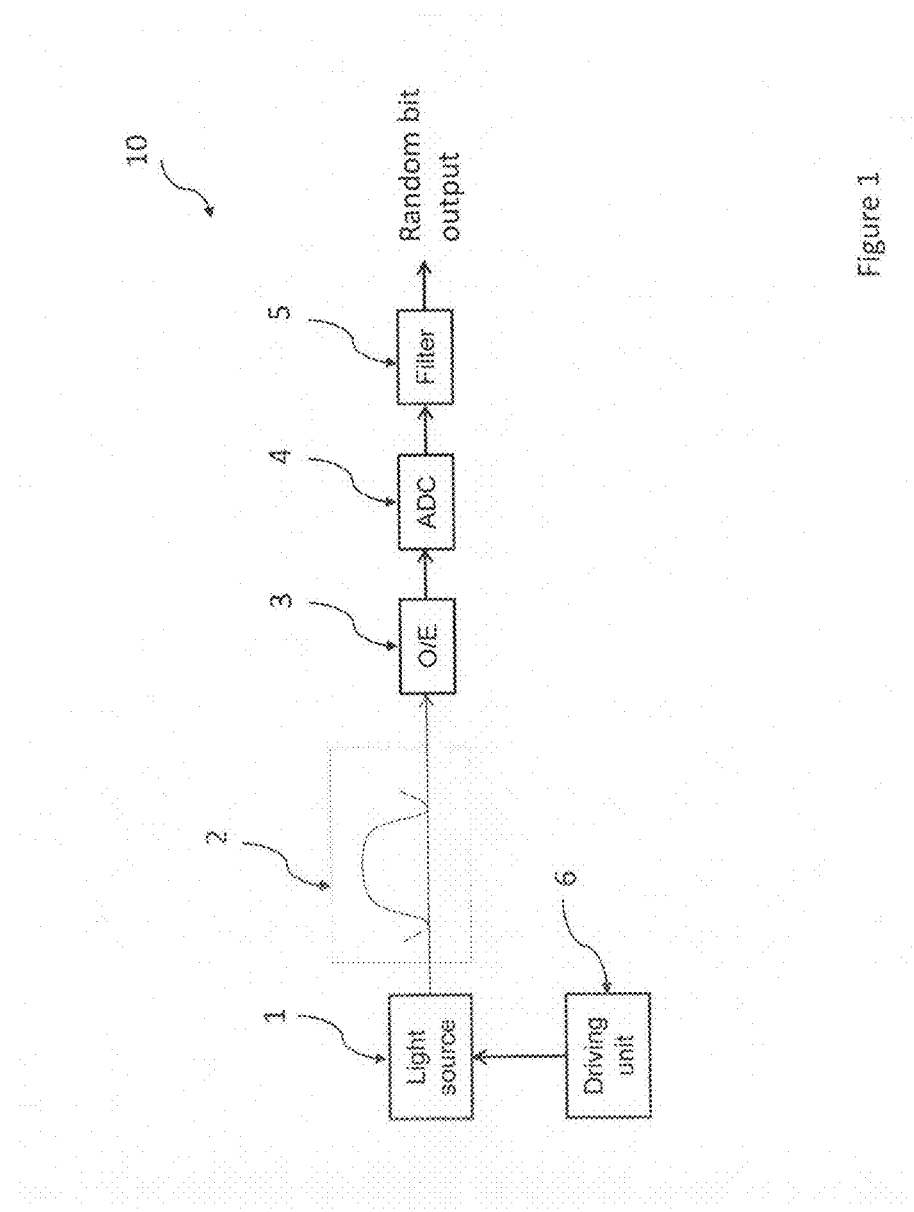
FIG. 1 is a schematic illustration of a RNG in accordance with an embodiment.

According to one embodiment, there is provided a random number generation system, comprising a light source configured to generate light pulses and a driving unit configured to drive said light source such that the phase of each light pulse has a random relationship to the phase of each subsequently generated light pulse, and such that each light pulse is generated with at least two local maxima in the temporal intensity profile.

In one embodiment, one local maximum is associated with an earlier part of the light pulse and a second local maximum is associated with a later part of the light pulse. In one embodiment, the later part of the light pulse has a longer duration than the earlier part of the light pulse. In one embodiment, the later part of the light pulse has a larger full width at half maximum (FWHM) than the earlier part. In one embodiment, the later part of the light pulse has a sharper wavelength distribution than the earlier part of the light pulse.

In one embodiment, each light pulse is generated with a spike-like temporal intensity profile followed by a second intensity peak with a larger FWHM than the spike-like feature. A first local maximum is associated with the spike-like feature and a second local maximum is associated with the second intensity peak.

In one embodiment, the temporal intensity profile of each of the generated light pulses comprises a part in which the intensity increases, a subsequent part in which the intensity decreases, and a subsequent part in which the intensity increases.

In one embodiment, each light pulse is generated with a spike-like temporal intensity profile followed by a plateau-like temporal intensity profile. A local maximum is associated with the spike-like feature and a second local maximum is associated with the plateau-like feature. The intensity of the plateau-like part of the light pulse is substantially constant. In one embodiment, the intensity of the plateau-like part of the light pulse does not vary by more than 20%.

In one embodiment, the part of the light pulse with a plateau-like temporal intensity profile has a longer duration than the part of the light pulse with a spike-like temporal intensity profile. In one embodiment, the part of the light pulse with a plateau-like temporal intensity profile has a sharper wavelength distribution than the part of the light pulse with a spike-like temporal intensity profile.

In one embodiment, the light source is a laser. In one embodiment, the light source is a gain-switched semiconductor laser. In one embodiment, the light source is a semiconductor laser diode that is electrically pulse driven.

In one embodiment, the driving unit applies a driving signal to the laser. Where the laser is a semiconductor gain-switched laser, the driving unit may apply a time varying electrical signal such as a time varying voltage or a time varying current to the laser.

The time varying electrical signal may comprise a series of current or voltage pulses having substantially flat-tops. In one embodiment, the variation in the amplitude of the pulse top is less than 20%. In one embodiment, the driving signal is an applied time varying voltage or current and the amplitude of the maximum applied voltage or current is at least 25% greater than the applied voltage or current required to reach the lasing threshold when operating under a DC voltage or current only.

The driving unit is configured to drive the light source such that the time between the generation of each light pulse is sufficiently long that the light pulses are initiated by spontaneous emission. In one embodiment, the driving unit is configured to drive the light source by applying a signal that varies with time with a frequency of less than 10 GHz. In one embodiment, the driving unit is configured to drive the light source by applying a signal that varies with time with a frequency of less than 2.5 GHz.

In one embodiment, the RNG further comprises an interference module, configured such that the random phase of each light pulse with respect to the phase of another generated light pulse is converted to random amplitude.

In one embodiment, the interference module comprises an asymmetrical Mach-Zehnder interferometer (AMZI). The AMZI comprises first and second optical paths with a difference in optical path length between the first and second optical paths. Light pulses emitted from the light source enter the AMZI. The optical path length difference in the AMZI corresponds to an integer multiple of one clock period of the light pulse emission to within a tolerance of 20% of the clock period. In one embodiment, an integer multiple of the delay between a pair of light pulses emitted from the light source matches the delay caused by the difference in optical path length between the first and second optical paths in the interferometer, sufficiently such that light pulses combine and interfere when exiting the interferometer.

In one embodiment, the interference module comprises a second light source and a beam splitter. Light pulses emitted from the light source enter one input of the beam splitter and light emitted from the second light source enters the other input of the beam splitter. Light pulses emitted from the light source interfere with light from the second light source at the beam splitter.

The second light source may be configured to generate continuous wave light. The second light source may be configured to generate light pulses having any temporal intensity profile.

In one embodiment, the second light source is configured to generate light pulses with at least two local maxima in the temporal intensity profile. In one embodiment, one local maximum is associated with an earlier part of the light pulses and a second local maximum is associated with a later part of the light pulse. In one embodiment, the later part of the light pulse has a longer duration than the earlier part of the light pulse. In one embodiment, the later part of the light pulse has a larger FWHM than the earlier part. In one embodiment, the later part of the light pulse has a sharper wavelength distribution than the earlier part of the light pulse. In one embodiment, each light pulse is generated with a spike-like temporal intensity profile followed by a second intensity peak with a larger FWHM than the spike-like feature. A local maximum is associated with the spike-like feature and a second local maximum is associated with the second intensity peak. In one embodiment, the temporal intensity profile of each of the generated light pulses comprises a part in which the intensity increases, a subsequent part in which the intensity decreases, and a subsequent part in which the intensity increases. In one embodiment, each light pulse is generated with a spike-like temporal intensity profile followed by a plateau-like temporal intensity profile. A local maximum is associated with the spike-like feature and a second local maximum is associated with the plateau-like feature. In one embodiment, the intensity of the part of the light pulse with a plateau-like temporal intensity profile does not vary by more than 20%. In one embodiment, the part of the light pulse with a plateau-like temporal intensity profile has a longer duration than the part of the light pulse with a spike-like temporal intensity profile. In one embodiment, the part of the light pulse with a plateau-like temporal intensity profile has a sharper wavelength distribution than the part of the light pulse with a spike-like temporal intensity profile.

In one embodiment, said second light source is a laser. In one embodiment, the second light source is a gain-switched semiconductor laser.

In one embodiment, a second driving unit applies a driving signal to the second light source. Alternatively, one driving unit applies a driving signal to both light sources. The driving signal may be a time varying electrical signal. The time varying electrical signal may comprise a series of current or voltage pulses having substantially flat-tops. In one embodiment, the driving signal is a time varying voltage or current and the amplitude of the maximum voltage or current is at least 25% greater than the voltage or current required to reach the lasing threshold when operating under a DC voltage or current only.

In one embodiment, the driving signal for the light source and the driving signal for the second light source are synchronised such that a light pulse from the light source and a light pulse from the second light source enter the beam splitter at the same time, to within a tolerance of 20% of the clock period of the light source.

In one embodiment, the interference module comprises a fibre optical ring resonator. The fibre optical ring resonator may comprise a beam splitter, and a fibre optic cable connecting one output of the beam splitter to one input of the beam splitter and thus forming a ring. In one embodiment, the optical path length of the ring results in an optical delay that is an integer multiple of the laser clock period to within a tolerance of 20% of the laser clock period. The value of the optical delay of the ring may also take account of the optical path length of the light source to the beam splitter.

In one embodiment, the RNG further comprises an optical electrical signal converter. The optical electrical signal converter is configured to measure the intensity of the light at the output of the interference module and convert the intensity to an electrical signal. In one embodiment, the optical electrical signal converter is a photodiode such as a semiconductor photodiode or a semiconductor avalanche photodiode. In alternative embodiments, the light source and optical electrical signal converter are provided by a single module, for example, a telecom transceiver such as a small-form-pluggable module. In one embodiment, the optical electrical signal converter is a photon detector.

In one embodiment, the RNG further comprises an analogue to digital converter which samples the output of the optical electrical converter and produces a sequence of N-bit integers.

In one embodiment, the components of the RNG are connected by waveguides, for example optical fibres. Alternatively, the RNG is constructed using micro-optics, and the light pulses travel between the components of the RNG through free space, meaning that no waveguides are required to connect the components. Alternatively, the RNG can be integrated onto a single photonic chip, for which the waveguides between the components are part of the photonic chip and are not optical fibres.

In one embodiment, the RNG further comprises a post-processing unit configured to reduce bias and/or correlation in the sequence of bits. In one embodiment, the post-processing unit is a finite impulse response filter configured to reduce bias and/or correlation in the output of the analogue to digital converter.

In one embodiment, the output of said finite impulse response filter is $$y[n] = \sum_{i=0}^{M} c_i x[n-i] \mod 2^k$$

where $x[n]$ is the nth output of the analogue to digital converter. $M \geq 1$ and is an integer. In one embodiment, $M=2$. The coefficients $c_i$ can be any real number. In one embodiment, the $c_i$ are integers. The value of k is less than or equal to the bit depth of the ADC. In one embodiment, the bit depth of the ADC is 8, and $k \leq 8$.

In one embodiment, $M=1$ and $c_0 = c_1 = 1$.

In one embodiment:

$$y[n] = (x[n] + 2x[n-1] + x[n-2]) \mod 2^k$$

In one embodiment:

$$y[n] = \sum_{i=0}^{M} \frac{M!}{i!(M-i)!} x[n-i] \mod 2^k$$

In one embodiment:

$$y[n] = \sum_{i=0}^{M} (-1)^i \frac{M!}{i!(M-i)!} x[n-i] \mod 2^k$$

According to one embodiment, there is provided a random number generation method, comprising applying a driving signal to a light source, such that said light source generates light pulses such that the phase of each light pulse has a random relationship to the phase of each subsequently generated light pulse and such that each light pulse is generated with at least two local maxima in the temporal intensity profile.

FIG. 1 is a schematic illustration of a random number generator (RNG) 10 in accordance with an embodiment. The RNG 10 is based on the random phase of each light pulse emitted from the light source 1 with respect to the phase of the other light pulses emitted. The light pulses interfere at the output of the interferometer 2, such that the random phase of each light pulse with respect to the phase of another light pulse with which it interferes is converted to random amplitude. The light source 1 is driven by a driving unit 6. The driving unit 6 drives the generation of light pulses in the light source 1 such that each light pulse is generated with at least two local maxima in the temporal intensity profile. An example of the temporal intensity profile of such a light pulse is that shown in FIG. 6(a)(ii). A second example of the temporal intensity profile of such a light pulse is that shown in FIG. 6(a)(iii).

In one embodiment, each light pulse is generated with a spike-like temporal intensity profile followed by a plateau-like temporal intensity profile. The part of the light pulse with a plateau-like intensity profile (referred to as the plateau-like part) is emitted after the part of the light pulses with a spike-like intensity profile (referred to as the spike-like part). The plateau-like part of the light pulse has a longer duration than the spike-like part of the light pulse. The longer duration means that there is a large tolerance in the precision of the match of the differential delay of the interferometer to the driving frequency in order that the pulses interfere. This leads to flexible operation conditions, and low costs, as interferometers with low precision have low manufacturing cost. It also leads to a large tolerance in the precision of the synchronisation of the digitisation of the signal, meaning that the RNG implementation can be simple. The plateau-like part of the light pulse is emitted in a steady state and has a sharp wavelength distribution. The sharp wavelength distribution, together with good temporal overlap, means that the interference is high quality.

The random number generator 10 comprises a light source 1, which can be, for example, a laser such as a gain-switched laser. The driving unit 6 is configured to drive the light source 1 to generate pulses of light. A gain-switched laser generates light when the laser is switched above the lasing threshold and generates almost no light when the laser is switched below the lasing threshold. The driving unit 6 can modulate the gain of the laser by modification of the pump power.

In one embodiment, the light source 1 is a semiconductor gain-switched laser. A semiconductor laser is pumped electrically, by applying a current or voltage. In embodiments in which the light source is a semiconductor laser, the driving unit 6 comprises a driving circuit which applies the current or voltage. In order to drive the semiconductor laser such that pulses of light are generated, a time varying current or voltage is supplied by the driving unit 6. For example, the driving unit 6 can comprise a bias-T, such as described later in relation to FIG. 2b.

In one embodiment, the light source 1 is a fibre laser or solid state laser that is pumped optically. In order to modulate the gain of a fibre laser or solid state laser the driving unit 6 modulates the optical input applied to the laser.

In one embodiment, light source 1 is an electrically driven, gain-switched semiconductor laser diode. In one embodiment, the gain-switched laser diode has a bandwidth of 10 GHz. In one embodiment, the gain-switched laser diode has a bandwidth of 2.5 GHz. Here, the bandwidth means the highest bit rate achievable with the gain-switched laser diode under direct modulation. A laser of a certain bandwidth can be operated at a lower clock rate.

The light source 1 is connected to an asymmetrical Mach-Zehnder interferometer (AMZI) 2 by a waveguide, for example an optical fibre. Alternatively, the random number generator 10 is constructed using micro-optics, and the light pulses travel between the components of the random number generator 10 through free space, meaning that no waveguides are required to connect the components. Alternatively, the random number generator 10 can be integrated onto a single photonic chip, for which the waveguides between the components are part of the photonic chip and are not optical fibres. For example, a laser can be integrated into a planar waveguide light circuit (PLC).

In one embodiment, the AMZI 2 is a fibre optic AMZI. The AMZI 2 comprises an input beam splitter and an output beam splitter, connected by both a short optical path length and a longer optical path length which has an optical delay Δt with respect to the short optical path length. The short optical path length is referred to as the short arm and the long optical path length is referred to as the long arm. The light source 1 is connected to one input of the input beam splitter. One output of the output beam splitter is connected to an optical/electrical signal converter (O/E) 3. One arm of the AMZI 2 may comprise a tuneable air gap, or tuneable delay line, in order to allow adjustment of the optical delay.

At the exit beam splitter of the AMZI 2, optical pulses travelling through the short arm and long arm should have the same polarisation in order for good interference. This may be achieved using polarisation maintaining waveguides and components. Alternatively, polarisation of photons in one of the arms may be controlled using a polarisation controller.

The O/E 3 is a photon detector. The O/E 3 can be, for example, a photodiode such as a semiconductor photodiode or a semiconductor avalanche photodiode. In alternative embodiments, the light source 1 and O/E 3 are provided by a single module, for example, a telecom transceiver such as a small-form-pluggable (SFP) module. A SFP module integrates a light source and a photon detector. The AMZI 2 can be placed externally to the SFP and the connections between the AMZI 2 and the SFP made via fibre connectors.

The output of the O/E 3 is connected to an analogue to digital converter (ADC) 4. The output of the O/E 3 is a sequence of voltage pulses, each voltage pulse corresponding to the interference of two light pulses. An ADC is a digitalizing device that converts each incoming electrical pulse into a digital integer. The ADC 4 converts each outputted voltage pulse from the O/E 3 to a digital integer. The ADC 4 outputs an integer number. For example, for an 8-bit ADC, the outputs are integers in the range from 0 to 255. An ADC has a number of output levels. The device determines, for each sampling point, which level most closely corresponds to the amplitude of the voltage. The integer corresponding to this level is output from the ADC 4. The integer is output in binary form. The number of bits in each output integer depends on the resolution of the ADC 4. For example, the integers can be 8 bits or 12 bits. The ADC 4 samples the signal from the O/E 3 at a particular frequency, known as the sampling rate. The ADC 4 is synchronised with the light source 1 such that it samples the interfering part of the light pulses. In other words, the ADC 4 is synchronised such that the times at which it samples the output signal of the O/E 3 coincides with the voltage produced by the interference of two light pulses.

In one embodiment, ADC 4 is an 8 bit ADC with a sampling rate of 1 GS/s.

In some embodiments, the output of the ADC 4 can be digitally filtered to remove bias. In the system shown in FIG. 1, the output of the ADC 4 is connected to a digital filter 5 that performs an unbiasing process. The filter reduces correlations and/or bias and results in a high quality of randomness. The filter will be described in more detail in relation to FIG. 14. In some embodiments, the RNG 10 does not comprise a filter, and the output of the ADC 4 is the output of the RNG 10.

Light source 1 is driven by driving unit 6 to generate light pulses. The driving unit 6 drives the light source 1 such that the light pulses are emitted with random phase when the driving frequency is less than or equal to 2.5 GHz. This means that the phase of each light pulse emitted from the light source 1 is unpredictable, and is not correlated to the phase of each other light pulse emitted. In a laser, the random nature of the phase of each light pulse generated arises because each light pulse is initiated through spontaneous emission. Spontaneous emission is a useful mechanism to generate quantum randomness as it can be ascribed to the vacuum fluctuations of the optical field. In a gain-switched laser diode, spontaneous emission influences the electromagnetic phase of each generated pulse. When the laser cavity prior to lasing is empty i.e. in the vacuum state, the lasing action is triggered entirely by spontaneous emission. Spontaneous emission inherits its electromagnetic phase from the vacuum, the phase of which is totally unbiased and random.

The empty cavity condition can be reached when cavity photons have a sufficient time to decay prior to each lasing event. For example, when a laser diode is gain-switched with a 2.5 GHz square wave, the average residual photon number of the cavity before the generation of each pulse is $10^{-10}$ (see Table 1). This intensity is orders of magnitude weaker than the spontaneous emission. In one embodiment, under a driving frequency of less than or equal to 4.0 GHz, each laser pulse will have a random electromagnetic phase.

The driving unit 6 is configured to drive the light source 1 such that there is sufficient time for residual cavity photons to decay between each lasing event that the light pulses are initiated through spontaneous emission instead of residual cavity photons. In one embodiment, the driving unit 6 is configured to drive the light source 1 with a time varying current or voltage with a frequency of less than or equal to 4.0 GHz. In one embodiment, the driving unit 6 is configured to drive the light source 1 with a time varying current or voltage with a frequency of less than or equal to 2.5 GHz. In one embodiment, the time gap between each generated light pulse is greater than or equal to 125 ps. In one embodiment, the time gap between each generated light pulse is greater than or equal to 200 ps.

The driving unit 6 is further configured to drive the light source 1 such that each light pulse is generated with two local maxima in the temporal intensity profile. In one embodiment, the driving unit 6 is configured to drive the light source 1 such that each light pulse is generated with a spike-like temporal intensity profile followed by a plateau-like temporal intensity profile. The plateau-like part of the light pulses is emitted in a steady state, meaning that the intensity of the plateau-like part is substantially constant. The FWHM of the plateau-like part is larger than the FWHM of the spike-like part. In one embodiment, the FWHM of the plateau-like part is at least three times larger than the FWHM of the spike-like part. The temporal profile of the light pulses is described in more detail in relation to FIG. 4. The plateau-like part has a longer duration and less intensity variation than the spike-like part. It also has a sharper wavelength distribution, as described later in relation to FIG. 6(a).

In one embodiment, the driving unit 6 is configured to apply a driving signal to the light source 1, wherein the amplitude of the driving signal is set such that the emitted light pulses comprise a spike-like narrower part and a plateau-like broader part. Where the laser is a gain-switched semiconductor laser, the driving unit is configured to apply a time varying voltage or current to the laser. For example, the time varying voltage or current applied to the laser may be a square wave AC voltage or current combined with a DC bias voltage or current.

Figure 4:
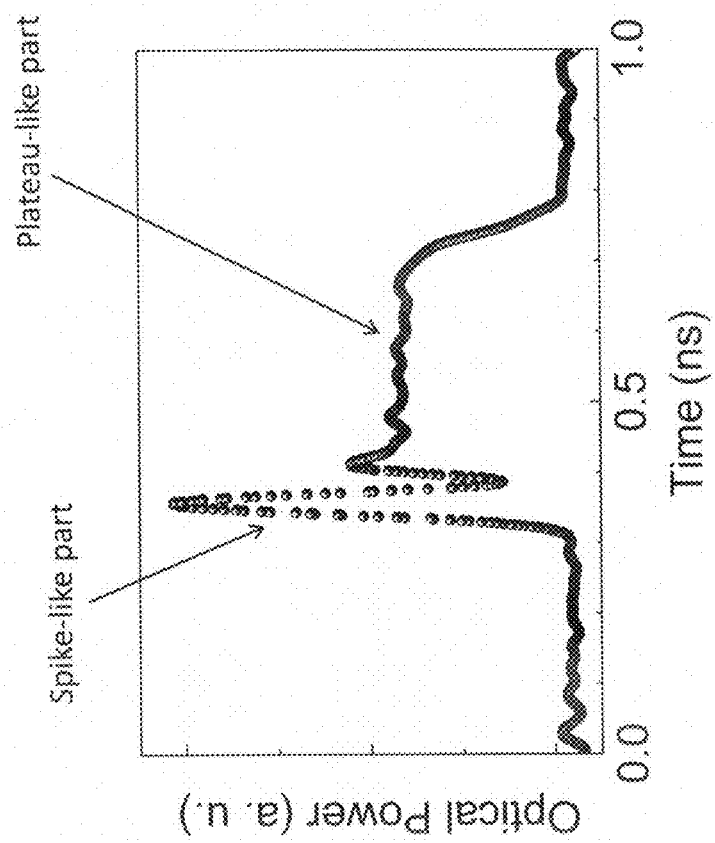
FIG. 4 shows a graph of the optical power (a.u.) against time (ns) for a light pulse with a spike-like temporal intensity profile followed by a plateau-like temporal intensity profile.

In one embodiment, the driving signal is a time varying signal, which switches between two amplitudes. The variation in amplitude of the time varying signal when in a first amplitude state is less than 20% of the amplitude. In one embodiment, the driving unit is configured to drive the laser with a driving signal which is an electrical pulse (i.e. a voltage or current pulse) with a substantially flat top, for example a square shaped pulse. In one embodiment, the amplitude of the flat pulse top does not vary by more than 20%. Driving the laser with a series of electrical pulses with substantially flat tops and with sufficient amplitude and DC bias causes light pulses to be emitted with a profile such as shown in FIG. 4.

Light pulses emitted from the light source 1 are directed into the input beam splitter of the AMZI 2. In one embodiment, the optical power of the light pulses is between 1 microwatt and 100 milliwatts. The input beam splitter sends a first fraction of each light pulse down the long arm of the AMZI 2 and a second fraction of each light pulse down the short arm. The long arm comprises an optical delay $\Delta t$, which matches the delay between the emission of the pulses from the light source 1 (or an integer multiple thereof) to within 20% of the delay between the emission times. The first fraction of a first pulse emitted from the light source 1 and the second fraction of a second pulse emitted from the light source 1 interfere at the output beam splitter.

The intensity of the light detected by the photodiode connected to one output of the output beam splitter depends on the phase difference between the first light pulse and the second light pulse (which is random). Therefore, for each pair of interfering pulses, a random intensity is measured at the photodiode at an output of the output beam splitter.

The phase randomness of the light pulses is converted into directly measurable intensity fluctuation using the AMZI 2. Other types of interferometer can also be used, for example, Michaelson interferometers or ring resonators. These types of interferometers can be constructed with fibre optics. The optical delay between the long path and the short path of the interferometer is such that interference occurs between light pulses emitted at different times from the light source. By matching the interferometer differential delay (i.e. the optical delay between the long arm and the short arm) to an integer multiple of the light source 1 clock frequency (i.e. the frequency of the time varying signal applied to the light source 1 by the driving unit 6), interference occurs in the output 50/50 beam splitter of the AMZI between light pulses emitted at different clock cycles. For example, the delay of the AMZI may be set such that a light pulse emitted from the light source 1 and travelling the long arm interferes with the light pulse emitted next from the light source, and which travels the short arm. With the plateau-like pulse emission, the delay of the AMZI is set to correspond to an integer multiple of the clock period of the light source 1, to within 20% of the emission period of the light source.

The AMZI itself may add a further phase difference between the pulses.

A phase difference between two emitted pulses that results in a phase difference of 0 between the pulses when they reach the output beam splitter (i.e. taking into account any further phase difference caused by travelling the different arms of the AMZI) leads to constructive interference, and a maximum intensity is measured at the photodiode (the O/E 3) (alternatively, depending on how the AMZI is set up and which output of the output beam splitter is connected to the photodiode, a phase difference of 0 at the output beam splitter may lead to a minimum intensity at the photodiode). If, on the other hand, there is a phase difference of $\pi$, destructive interference occurs at the output beam splitter and a minimum intensity is measured (or, a maximum intensity, depending on which output of the beam splitter is being measured). For any other value of phase difference there will be an intermediate intensity measured at the photodiode.

The phase difference between the two arms of the AMZI 2 may drift over time. Small amounts of drift will not affect the ADC 4 readout because of its finite resolution. For example, the AMZI 2 may drift in phase at a rate of about $2\pi$ per 10-100 seconds. This drift will produce an additional output variation of less than $<10^{-9}$ between two adjacent pulses emitted by the light source 1 clocked at 1 GHz, which will not affect the readout of an 8 bit ADC. In some embodiments, temperature stabilisation may be included in order to compensate for this drift.

In the system shown in FIG. 1, a laser diode is driven to achieve steady state pulse emission. The emitted pulses are then fed into a coarse AMZI 2 to interfere optical pulses generated in different driving clock cycles. The AMZI 2 is asymmetric, i.e. the optical length of one arm is longer than the other. Each input pulse is split into two, such that one fraction of the pulse travels through the short arm and one fraction travels through the long arm. Both fractions have the same temporal profile, i.e. both fractions comprise a spike-like, narrower part and a plateau-like broader part. The optical pulses interfere with each other at the exit beam splitter of the AMZI 2 when there is temporal overlap between optical pulses passing through the long and the short arms. The optical interference output is converted into electrical signal by an O/E 3, the electrical signal is then digitized by an ADC 4.

In some embodiments, the ADC 4 output can be filtered by a digital filter 5 to remove bit correlations and produce an output of unbiased random numbers.

In this embodiment, an AMZI 2 is used to interfere the optical pulses. In alternative embodiments, the AMZI 2 is replaced with any other type of interferometer, such as a Michaelson interferometer or a ring-resonator. The interferometer can be fibre based or can be a free space interferometer.

The O/E 3 can be viewed as a linear device. The output range of the O/E 3 is determined by the optical input, i.e. the interference output range. However, the ADC 4 has a pre-set range, for example, 0-800 mV. For a good extraction rate, the output of the O/E 3 should match the ADC input as closely as possible. In one embodiment, the output range of the O/E is within 100 mV of the pre-set range of the ADC. In one embodiment, the ranges of the O/E 3 and the ADC 4 are matched in order to achieve the best random number extraction rate using either an optical attenuator before the O/E 3 or an electrical amplifier/attenuator after the O/E 3. The extraction rate cannot exceed:

$$E \leq N - \left|\log_2\left(\frac{Range_{ADC}}{Range_{O/E}}\right)\right|$$

where E is the maximum extraction rate and N is the bit depth of the ADC.

In an extreme example where the O/E output does not match the ADC input, the O/E output range is 0-1 mV and the ADC range is 0-800 mV, i.e. there is underfilling. The 8-bit ADC output will have two possibilities in this case, 0 or 1/256 of the 800 mV range. Thus the output of the interference can contain at most 1 bit per interference for this extreme example.

The RNG 10 can achieve high speed, robust interferometric random number generation using the steady state emission of a pulsed laser diode. The RNG 10 is based on the steady state emission of long laser pulses from a gain-switched laser. The laser diode is driven with a large amplitude electric signal to achieve steady state emission. The driving unit 6 is configured to drive the light source 1 such that each pulse has a broader plateau-like part. The duration of the steady state emission of each pulse can be, for example, several hundred picoseconds. Switching the gain above and below the threshold allows randomness of the electromagnetic phase of the generated optical pulses. The long duration of the pulses (caused by the duration of the second, plateau-like part, which is longer than the duration of the spike-like part) means good visibility due to the accompanying narrow spectral width, and means interference and temporal overlap is achieved. Interference is still achieved even with interferometer misalignment therefore a low precision interferometer can be used. Random number generation using steady-state emission can tolerate large temporal pulse misalignments and has high interference quality. The RNG can operate with flexible clock frequencies and is robust against fluctuations in the system clock frequency and time jitter in the ADC sampling. The clock frequency can be tuned according to the application and can be integrated into a larger system, for example, a quantum key distribution system. Using a synchronous 8-bit digitizer and post-processing (which will be described later in relation to FIG. 14), a random bit rate of up to 20 Gb/s that passes stringent statistical tests for randomness can be achieved.

FIG. 2(*a*) shows a schematic illustration of a semiconductor laser diode 35 driven by a combination of direct current and alternating current sources 36. The current sources 36 are an example of a driving unit 6 such as is shown in FIG. 1. The current sources can provide the current through a bias-T such as is shown in FIG. 2(*b*). The current sources 36 drive the laser diode 35 such that light pulses are emitted. The emitted light pulses are the optical output.

FIG. 2(*b*) shows a schematic illustration of part of an electrical driving circuit for a semiconductor gain-switched laser. The semiconductor gain-switched laser is laser diode 31. The cathode of laser diode (31) is connected to bias-T (32) comprising inductor (33) and resistor or capacitor (34). Via inductor (33) a DC bias voltage is sent through the laser diode. This provides the gain bias (the medium level of the voltage). Via resistor or capacitor (34) an AC modulation voltage is sent through the laser diode, providing the gain modulation needed for gain-switching the laser above and below the lasing threshold.

The direct current source is tuneable by its bias current or voltage.

FIG. 3(*a*) is an illustration of a time varying voltage signal applied to the gain switched laser in order to generate light pulses with a spike-like temporal intensity profile, and the corresponding carrier density and laser intensity of the gain switched laser.

The upper graph shows the driving voltage applied to the gain-switched laser. The vertical axis shows the amplitude of the applied voltage bias. The horizontal axis for all three graphs is time. The voltage has the form of a square wave. Due to the coupling scheme illustrated in FIG. 2(*b*), the AC modulation voltage periodically increases the bias applied to the gain-switched laser above the DC bias value. The DC bias value $V_{DC}$ is indicated with a dotted line. The peak to peak AC amplitude is $V_{AC}$. The magnitude of the total voltage applied to the gain-switched laser when in the "on" state is the sum of half the peak to peak AC amplitude plus the DC level, indicated on the figure as $V_{TOTAL}$, where $V_{TOTAL} = V_{DC} V_{AC}/2$.

The middle graph shows the variation in the carrier density with the applied driving voltage bias. The current induced by this driving voltage drives carriers into the lasing cavity region. When the voltage is applied, the carrier density increases. The lasing threshold is indicated with a dashed line.

The lower graph shows the laser intensity as a function of time. When the current modulation pulse is applied to the laser, the injected carriers increase the carrier density. When the carrier density is above the lasing threshold, a lasing action can be triggered by a spontaneously emitted photon inside the laser cavity. Due to the time uncertainty of spontaneous emission, the carrier density can reach much higher than the lasing threshold before lasing. Under the driving condition depicted in FIG. 3(*a*), the carrier density increases slowly and the lasing threshold is reached nearly at the end of the AC voltage pulse. The carrier density peaks above the lasing threshold and then decreases. A short laser pulse is obtained with a single spike-like intensity feature.

FIG. 3(*b*) is an illustration of a time varying voltage signal applied to the gain switched laser in order to generate light pulses with at least two local maxima, and having a plateau-like part and a spike-like part, and the corresponding carrier density and laser intensity.

The upper graph shows the driving voltage applied to the gain-switched laser. The vertical axis shows the amplitude of the applied voltage bias. The horizontal axes of all three graphs show time. The biasing condition in FIG. 3(*b*) comprises an applied voltage pulse which has the form of a square wave. Due to the coupling scheme illustrated in FIG. 2(*b*), the AC modulation voltage periodically increases the bias applied to the gain-switched laser above the DC bias value. The DC bias value $V_{DC}$ is indicated with a dotted line. The peak to peak AC amplitude is $V_{AC}$. The magnitude of the total voltage applied to the gain-switched laser when in the "on" state is the sum of half the peak to peak AC amplitude plus the DC level, indicated on the figure as $V_{TOTAL}$, where $V_{TOTAL} = V_{DC} V_{AC}/2$. In one embodiment, the total bias, $V_{TOTAL}$, is at least 25% greater than the bias required to reach the lasing threshold when operating under DC bias only. In one embodiment, the voltage pulses have a substantially flat top profile. In one embodiment, the variation in the amplitude of the pulses is less than 20% of the amplitude.

In one embodiment, the bias voltages are chosen such that $V_{DC}-V_{AC}/2<V_{th}<V_{DC} V_{AC}/2$, where $V_{th}$ is the laser threshold when operating under DC bias only. The laser must be biased below its lasing threshold during the troughs of the AC driving pulses.

Figure 3B:
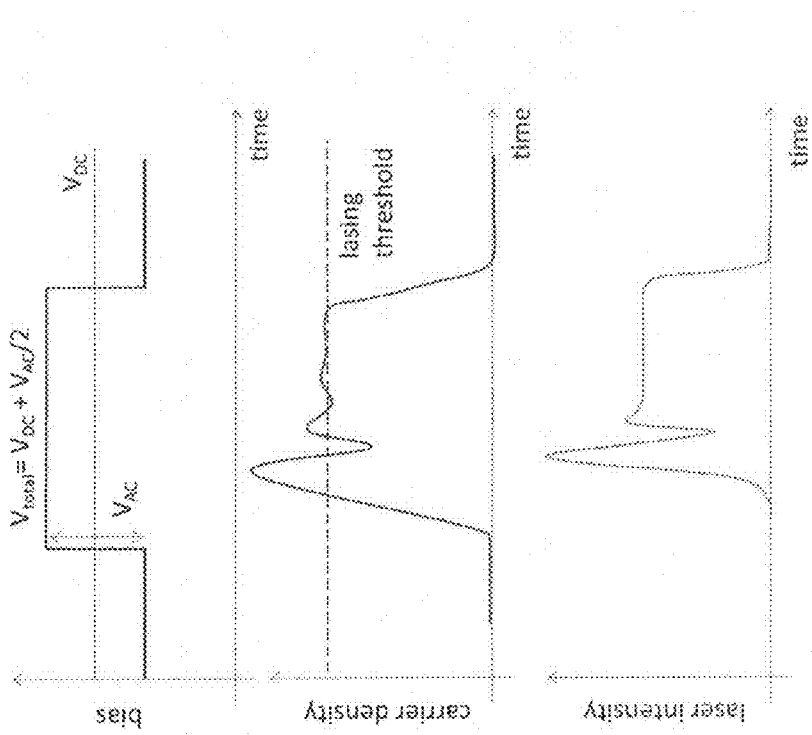
FIG. 3(b) shows three graphs, the first is an illustration of a time varying voltage signal applied to a gain switched laser in order to generate light pulses with a spike-like temporal intensity profile followed by a plateau-like temporal intensity profile, the second is the corresponding carrier density in the laser and the third is the laser intensity.
Figure 3A:
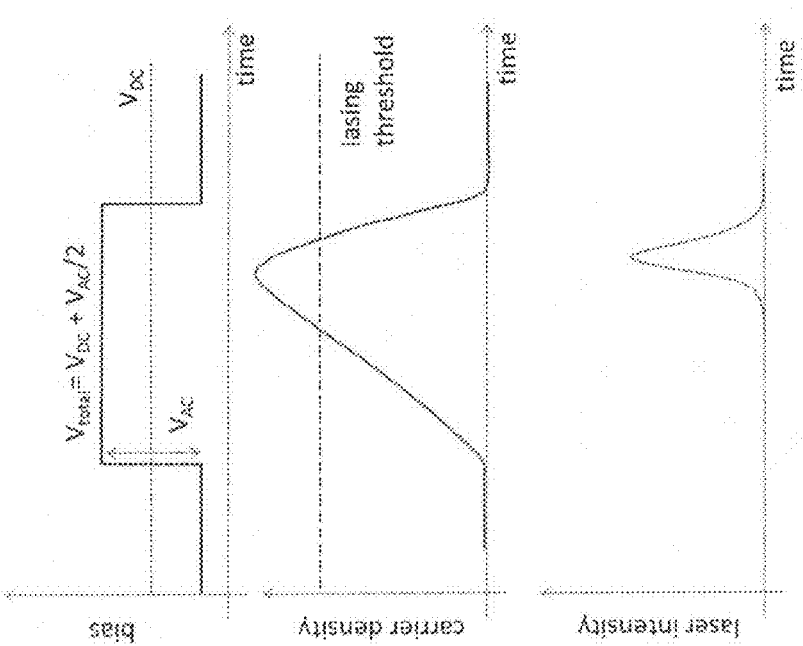
FIG. 3(a) shows three graphs, the first is an illustration of a time varying voltage signal applied to a gain switched laser in order to generate light pulses with a spike-like temporal intensity profile, the second is the corresponding carrier density in the laser and the third is the laser intensity.

The DC bias in FIG. 3(b) is higher than the DC bias in FIG. 3(a). As a result, the carrier density increases more rapidly and reaches the lasing threshold at a much earlier time. When the carrier density is above the lasing threshold, a lasing action can be triggered by a spontaneously emitted photon inside the laser cavity. Due to the time uncertainly of spontaneous emission, the carrier density can reach much higher than the lasing threshold before lasing commences.

Initially the light intensity will overshoot and quickly reduce the carrier density. This generates a spike-like part of the light pulse. The length of the delay between the application of the voltage modulation pulse and the generation of the output light depends on several parameters, such as the laser type, cavity length and AC driving current.

The reduction in the carrier density decreases the photon density in the laser cavity. As lasing is a stimulated emission process, the emission rate is proportional to the cavity photon density. Therefore, the photon emission rate is reduced to allow the re-build up of the carrier density, increasing the light intensity. This competing process causes oscillations of the light intensity. This causes the profile of the spike-like part of the light pulse, which consists of a peak. The spike-like part of the light pulse therefore comprises the initial increase, then decrease of photon density.

At the point that the photon density increases for the second time, this is the beginning of the plateau-like part. The oscillations in the photon density are strongly damped, and therefore at this point there is a steady-state emission, in which the intensity is substantially constant. In one embodiment, the intensity does not vary more than 20% of the maximum value. The laser pulse ends when the voltage pulse ends and switches the voltage to the bias value again.

In FIGS. 3(a) and 3(b), voltage bias is used for illustration. Current bias can also be used in a similar manner to generate the laser emissions shown in FIGS. 3(a) and 3(b).

FIG. 4 shows a graph of the optical power (a.u.) against time (ns) for a light pulse with a spike-like temporal intensity profile followed by a plateau-like temporal intensity profile. The light pulse comprises a spike-like narrower part and a broader plateau-like part. The optical power is measured using a photodiode of 20 GHz bandwidth in a mainframe sampling oscilloscope. The graph shows the optical power measured with increasing time.

The two parts of the light pulse have different intensity profiles. The plateau-like part is emitted from the light source 1 after the spike-like part. There may also be a second spike-like feature superimposed upon the plateau-like part. In the profile of the light pulse shown in FIG. 4, there is an initial spike-like part, followed by an increase in intensity forming a smaller peak, followed by a plateau-like part. The smaller peak is superimposed on the plateau-like part of the light pulse. The plateau-like part has a longer duration than the spike-like part, in other words the plateau-like part has a broader temporal width than the spike-like part. In this case, the duration of the spike-like part is around 40 ps and the duration of the plateau-like part is around 400 ps.

The maximum intensity of the plateau-like part is less than the maximum intensity of the spike-like part. The plateau-like part is emitted in a steady state, in other words, the variation in the intensity over the duration of the plateau-like part is less than 20% of the maximum intensity of the plateau-like part. The plateau-like part of the light pulse does not include the second, smaller peak, therefore the variation in the intensity over the duration of the plateau-like part does not include the intensity of the smaller peak. The FWHM of the plateau-like part is larger than the FWHM of the spike-like part. In one embodiment, the FWHM of the plateau-like part is at least three times larger than the FWHM of the spike-like part. The plateau-like part has a longer duration and less intensity variation than the spike-like part. It also has a sharper wavelength distribution.

In order that two light pulses interfere at the output beam splitter of the AMZI 2 there must be sufficient overlap between them. The plateau-like part of the light pulses has a longer duration than the spike-like part, and therefore there is a long period of time during which two pulses with such an intensity profile will overlap.

FIG. 5 shows the intensity of light arriving at the output beam splitter against time. These figures show the optical pulse train arriving from the short and long arms of the AMZI 2. FIG. 5(a) shows the light from the short arm of the AMZI 2 and FIG. 5(b) shows the light from the long arm of the AMZI 2. The vertical axes for both shows the intensity. The horizontal axis for both is time. For both figures, the light arrives in pulses with a spike-like temporal intensity profile followed by a plateau-like temporal intensity profile. The first part of each light pulse to arrive at the output beam splitter is the spike-like part. The second part of each light pulse to arrive at the output beam splitter is the plateau-like part. The laser source is driven repetitively with a clock period of $T_0$. The duration of time between the peak of the spike-like part of one light pulse arriving from the short arm and the peak of the spike-like part of the next light pulse arriving from the short arm, $T_0$, is indicated. The duration of each light pulse $t_s$, is also indicated.

Light arriving from the short arm of the AMZI 2 comprises a sequence of three pulses, pulse i, pulse i+1 and pulse i+2. The term "i" is an integer value denoting the optical pulse emitted at the i-th clock. In other words, for the first clock period, i=1, for the second clock period, i=2 etc. The first pulse in the sequence is emitted in the i-th clock period. Therefore the second pulse in the sequence is emitted in the i+1 clock period. Due to the delay in the long arm, optical pulses emitted at earlier clock periods passing through the long arm will coincide with optical pulses emitted at later clock periods passing through the short arm. The difference between the clock numbers is an integer "j". In other words, the optical pulses travelling the long arm were emitted j clock periods before the clock period at which the coinciding optical pulse travelling the short arm was emitted. Light arriving from the long arm of the AMZI 2 therefore comprises a sequence of three pulses, pulse i-j, pulse i-j+1 and pulse i-j+2.

In one embodiment, the interferometer is such that the differential delay between long and short arms gives j=1. In other embodiments, j≥2.

The first light to arrive at the output beam splitter is from the short arm of the AMZI 2. Light from the long arm of the AMZI 2 arrives next. The length of time between the arrival of the peak of the spike-like part of the first light pulse from the short arm and the peak of the spike-like part of the first light pulse from the long arm is Δt. The long arm produces a delay of $jT_0+\Delta t$. There will be overlap and interference, provided that Δt is smaller than the time duration of the whole optical pulse. Interference will occur if $\Delta t<t_s$.

There is no overlap between the spike-like parts of the light pulses from the short arm and the long arm. However, there is an overlap between the light pulses as a whole. The longer duration of the plateau-like part means a large overlap between pulses arriving from the short arm and pulses arriving from the long arm, even though the pulses are displaced by Δt.

The overlap between the second pulses from each arm is indicated by a grey shaded region. This region is the temporal overlap, where interference takes place.

The duration of the plateau-like part is longer than the spike-like part. This means that the AMZI differential delay does not have to match precisely to the laser clock frequency in order for the pulses to overlap.

Figure 6A:
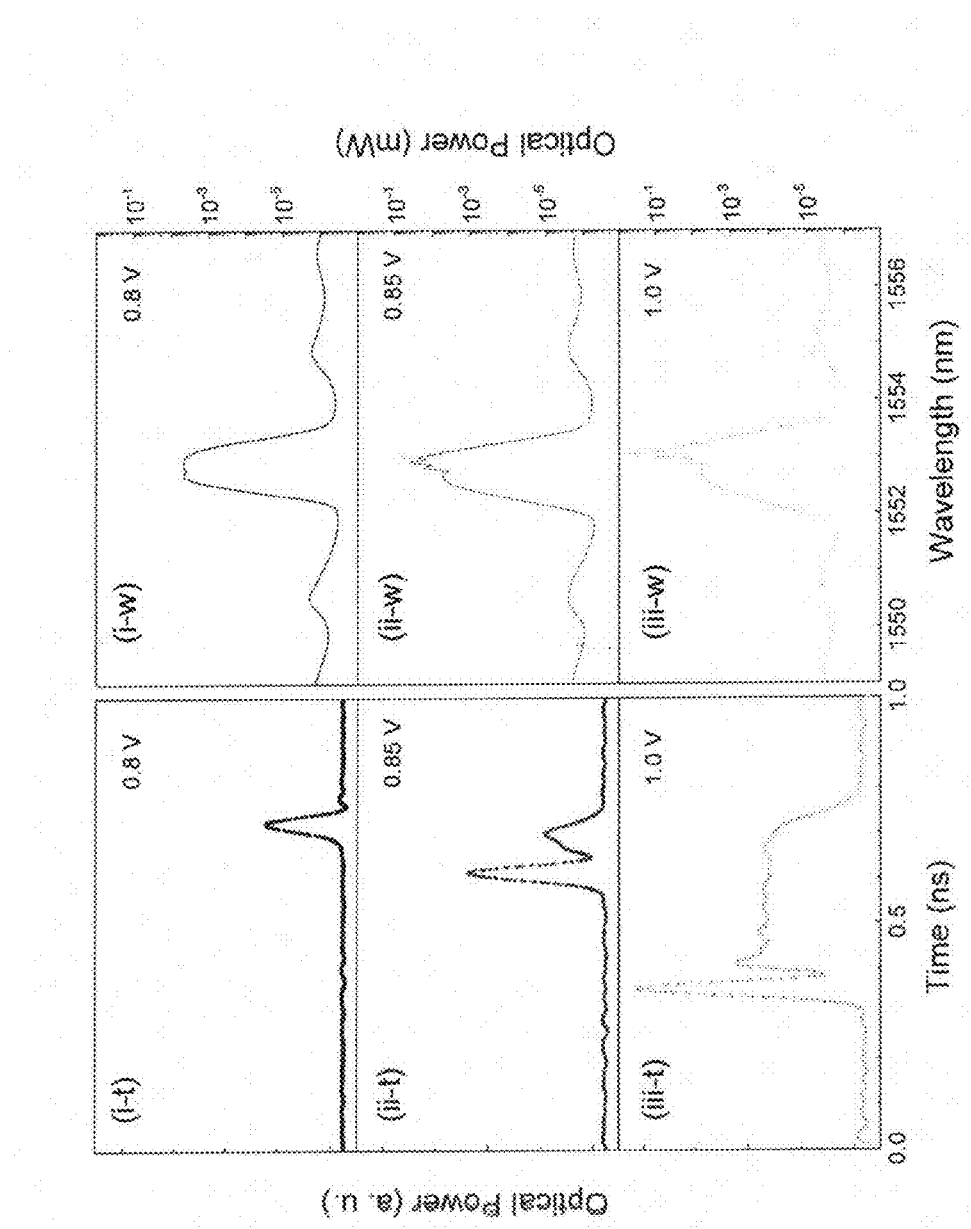
FIG. 6(a) shows a series of optical emission spectra of pulses emitted from a laser under different driving conditions.

FIG. 6(a) shows a series of optical emission spectra of pulses emitted from a laser under different driving conditions.

The left hand graphs show the optical power (a.u) against time for an emitted light pulse. The left hand graphs show time on the horizontal axis in ns and optical power in a.u. on the vertical axis. The right hand graphs show the wavelength spectrum of the pulses, with the wavelength in nm on the horizontal axis and the optical power in mW on a logarithmic scale on the vertical axis.

Each pair of graphs show the properties of a light pulse generated using the same laser, but with different driving signals. The laser is a 1550 nm gain-switched laser (bandwidth 10 GHz) driven by a DC source and a 2 V, 1 GHz voltage square wave. The lasing threshold is approximately 0.8 V for the laser diode emitting at the telecom wavelength of 1550 nm. The DC bias is varied between each set of spectra.

The first two spectra (i-t and i-w) in the sequence are for a light pulse emitted when the laser is driven by a 2V, 1 GHz square wave superimposed on a DC bias of 0.8 V. Under a 0.8V DC bias, the laser diode emits a short, spike-like pulse each clock cycle. The AC signal of 2 V gives ±1 V voltage swing above and below the DC bias. The total voltage applied to the laser during the pulse of the AC current is 1.8 V.

The left hand graph of the pair is the temporal profile of the light pulse. The pulse is 37 ps at FWHM. The light pulse consists of a single, spike-like part only. The pulse is generated as a result of the gradual build-up of carriers towards the lasing threshold.

The right hand graph is the wavelength spectra of the light pulse. The frequency chirp means that the wavelength spectrum is broad. The wavelength spectrum of the pulse comprises a broad peak with a FWHM of around 1 nm.

The second two graphs in the sequence (ii-t and ii-w) are for a light pulse emitted when the laser is driven by a 2V, 1 GHz square wave superimposed on a 0.85 V DC bias, i.e. with an increased DC bias compared to the DC bias used to generate the light pulse shown in the first two graphs.

The left hand graph shows the temporal profile of the light pulse. With an increased DC bias, the light pulses start to split into two parts. Neither of the parts is a plateau-like part. The later part has a longer duration than the earlier part. The earlier park has a spike-like temporal intensity profile. The later part is a peak with a larger FWHM than the earlier part.

The right hand graph is the wavelength spectra of the light pulse. The wavelength spectrum now comprises two components. The smooth shoulder at the shorter wavelength corresponds to the earlier spike-like part of the light pulse, while the spectrally noisy emission at the longer wavelength corresponds to the later peak. The later peak has a longer duration than the first spike-like part, therefore the later peak has a narrower spectral distribution.

Light pulses with a temporal intensity profile such as that shown in FIG. 6(a)(ii-t) can be interfered using an AMZI to produce a random intensity. The broader temporal width of the later part of the light pulse compared to the spike-like part of the light pulse means that the AMZI can be low precision. Precise control of the differential delay of an AMZI requires bulky optical components and is time-consuming. The broad temporal width of the light pulses means that there is a significant tolerance in the differential delay. The setup of the random number generator is therefore simple.

The final two spectra in the sequence (iii-t and iii-w) are for a light pulse light pulse emitted when the laser is driven by a 2V, 1 GHz square wave superimposed on a 1 V DC bias.

The left hand graph shows the temporal profile of the light pulse. The total voltage applied to the laser during the pulse of the AC current is 2 V. Because the voltage is raised, lasing starts much earlier due to fast carrier build up. The intensity initially oscillates, but relaxes rapidly into a steady state after around 100 ps. The light pulse has two parts, a spike-like part, in which the intensity increase is fast and a plateau-like part with a relatively slower intensity increase following. Under the higher DC bias of 1 V, the later part develops into a steady state emission. The spike-like part is shorter than the plateau-like part. The spike-like part is around 40 ps in duration. The duration of the plateau-like part is around 400 ps. The steady state is a result of an approximate equilibrium between electrical injection and radiative depletion of charge carriers. In other words, formation of a steady state results from a balance between electrical injection and radiative depletion of carriers in the laser cavity media. The intensity of the plateau-like part does not vary substantially until it is quenched at the falling edge of the driving square wave.

The right hand graph is the wavelength spectra of the light pulse. The wavelength spectrum of the light pulse has a sharp, intense feature at 1553.04 nm, illustrating that almost no frequency chirp exists. This sharp, intense feature corresponds to the plateau-like part of the light pulse in Figure (iii-t). The sharp peak will allow high quality interference. The peak is narrower than for the light pulses emitted when the laser is driven with a 0.8 V DC bias. The broad shoulder at lower wavelength corresponds to the spike-like part of the light pulse.

The steady state pulse emission is used in the interference for random number generation. Light pulses with a temporal intensity profile such as that shown in FIG. 6(a)(iii-t) can be interfered using an AMZI to produce a random intensity. The broader temporal width of the plateau-like part of the light pulse compared to the spike-like part of the light pulse means that the AMZI can be low precision. Precise control of the differential delay of an AMZI requires bulky optical components and is time-consuming. The broad temporal width of the plateau-like part of the light pulses means that there is a significant tolerance in the differential delay. The setup of the random number generator is therefore simple. The sharp wavelength distribution will produce high quality interference.

Figure 6B:
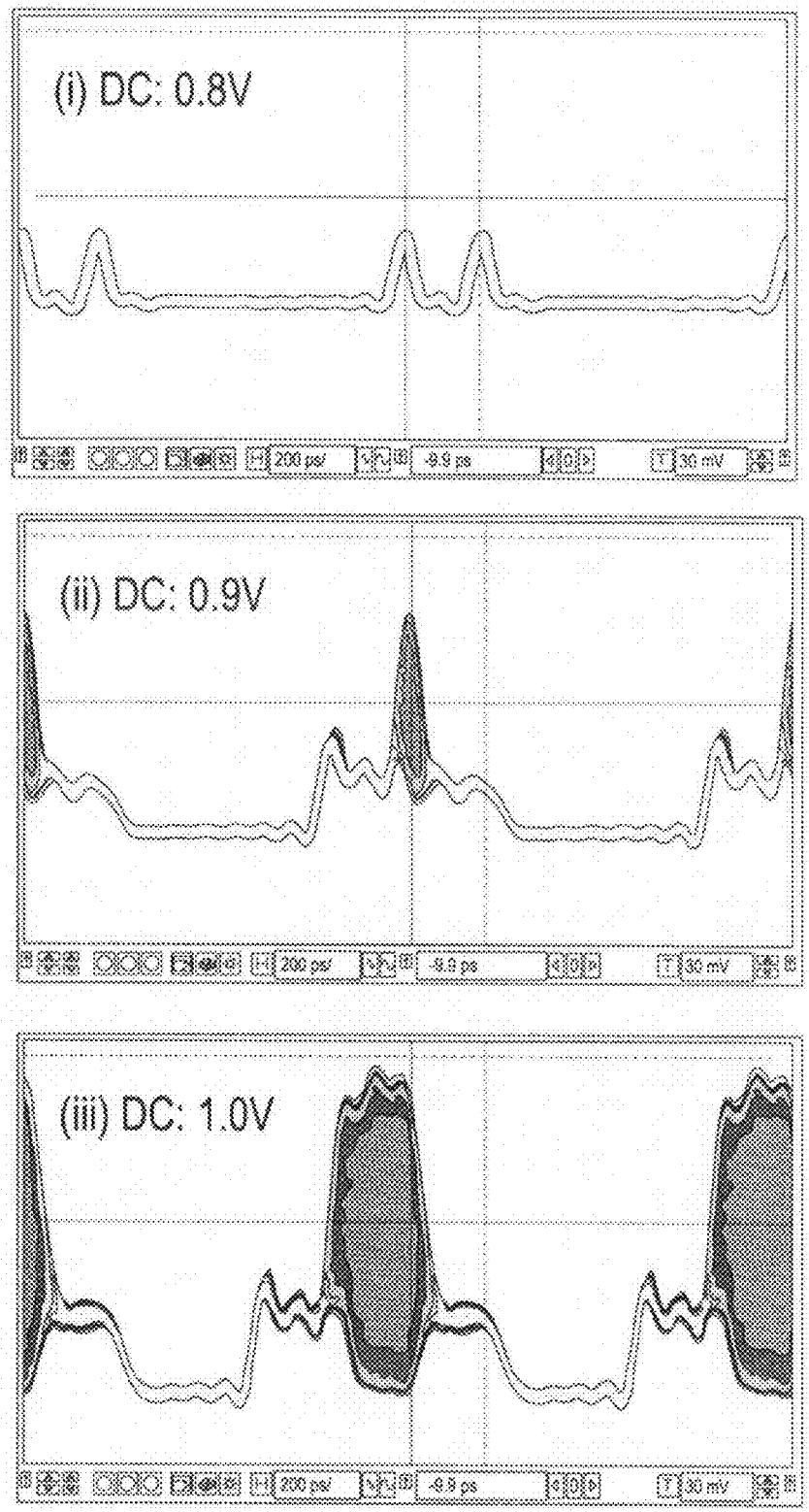
FIG. 6(b) shows three graphs of the intensity of light pulses against time measured using a real-time oscilloscope at the output beam splitter of an AMZI in a RNG such as that shown in FIG. 1.

FIG. 6b shows three graphs of the intensity measured at the output beam splitter of the AMZI 2 against time using a real-time oscilloscope. The vertical axes for all graphs show the intensity. The horizontal axis for is time. The oscilloscope is set in persistent display mode, in which many waveforms are overlaid in the same graph. When there is no interference, the intensity at each time delay is fixed. When interference occurs, the interference can produce any intensity between that corresponding to constructive interference and that corresponding to destructive interference.

For all three cases, the laser is clocked at 1 GHz. In order to precisely match the laser frequency, the AMZI differential delay should be 1 ns. For all three cases, the AMZI has a differential delay of 800 ps, meaning that the AMZI is detuned with respect to the laser frequency by 200 ps. The AC driving signal is the same for all three cases, and is a 2 V, 1 GHz square wave. The interference is tuned in-situ between the three cases by increasing the DC bias from 0.8V for the case shown in (i) to 0.9 V for the case shown in (ii) to 1 V for the case shown in (iii), in which the interference strength is sufficient for random number generation.

In FIG. 6(b)(i), a DC bias of 0.8 V is applied to the light source 1. The light source 1 emits a spike-like pulse. Passing through the detuned AMZI, the laser pulse is split into two fractions. A first fraction from one light pulse and a second fraction from a second light pulse arrive at the output beam splitter approximately 200 ps apart and are not temporally overlapped. The optical intensity measured at the output beam splitter of the AMZI is shown in FIG. 6b(i). Two spike-like pulses are measured. The pulses do not interfere.

In FIG. 6(b)(ii), an increased DC bias of 0.9 V is applied to the light source 1. The emitted light pulses have a plateau-like part, and the temporal overlap between a first fraction from one light pulse and a second fraction from a second light pulse arriving at the output beam splitter is increased compared to that for FIG. 6(b)(i). Interference between the two pulses occurs and is shown by the dark area on the graph.

In FIG. 6b(iii), a DC bias of 1 V is applied to the light source 1. The emitted light pulses have a plateau-like part, and the temporal overlap between a first fraction from one light pulse and a second fraction from a second light pulse arriving at the output beam splitter is increased compared to that for FIG. 6(b)(ii). The temporal overlap becomes significant under a DC bias of 1.0 V and interference becomes prominent. The interference between the two pulses is indicated by the dark area on the graph, which is larger than that shown in FIG. 6(b)(iii).

In-situ tuning can also be achieved by tuning the amplitude of the AC driving signal while the DC signal is kept constant. In other words, the amplitude of the AC voltage applied to the laser can be increased and the DC signal kept constant in order to increase the interference at the output beam splitter such that it is sufficient for random number generation.

Figure 7:
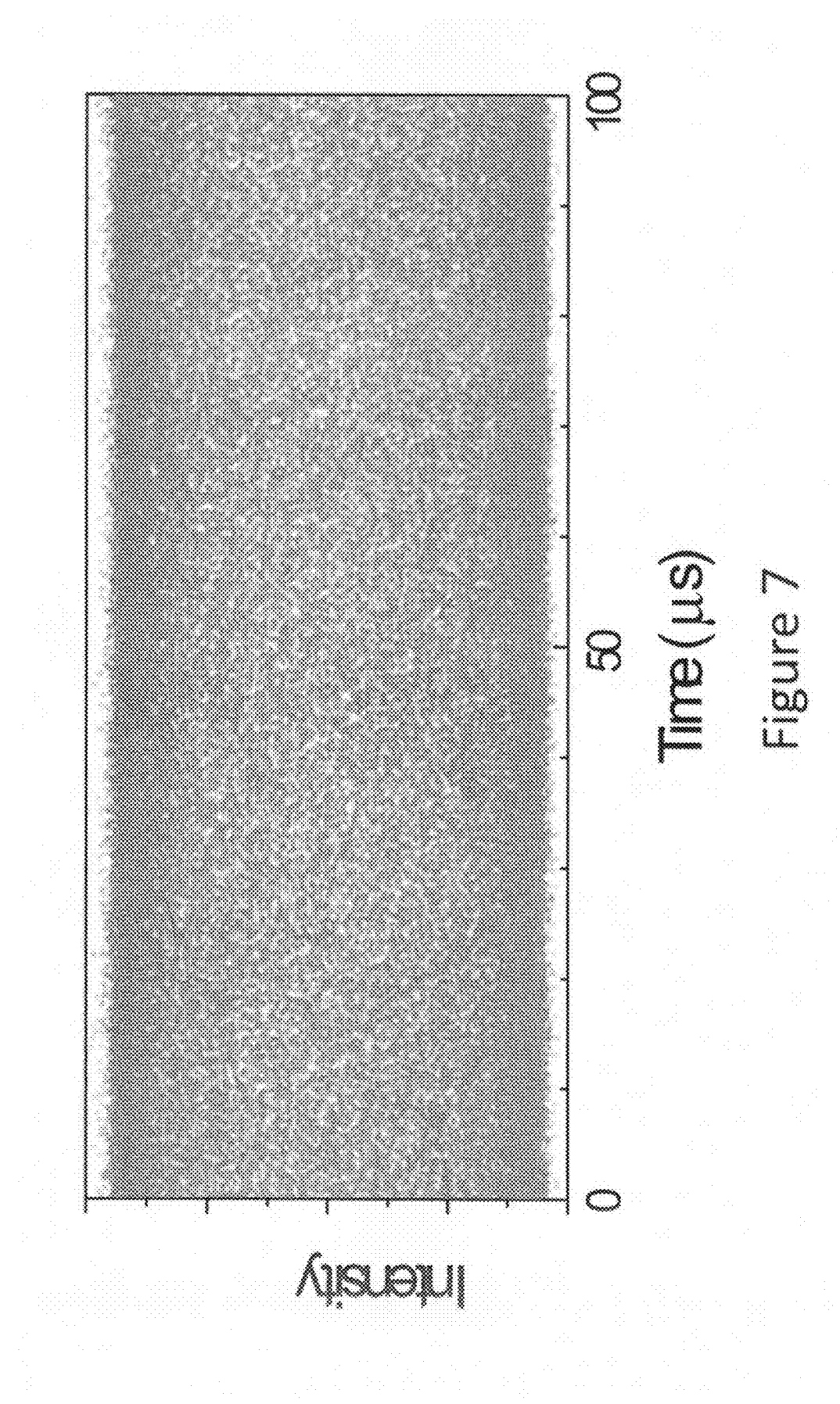
FIG. 7 shows the output record of 100 μs of an ADC in a RNG such as shown in FIG. 1 in which the AMZI is detuned by 200 ps to the 1 GHz laser clock rate, sampled at 1 GHz.

For the experimental set up in which pulses with a spike-like temporal intensity profile followed by a plateau-like temporal intensity profile, the longer duration means that a large tolerance in the misalignment of the differential delay of the AMZI is possible. For example, the AMZI delay can be detuned by 20%. This results in an offset of 200 ps against the laser clock period of 1 ns, corresponding to a fibre length of ~40 mm, easily achievable without an adjustable delay element, such as an air-gap (a mismatch within 10 mm is easy to achieve without using an air-gap). FIG. 7 shows an ADC record of 100 μs sampled at 1 GHz under this detuned condition. The intensity fluctuation distributes densely at constructive or destructive interferences, suggesting little degradation in interference quality. This demonstrates that the RNG has high stability, and tolerates ±20% deviation to its central operation frequency.

Figure 8:
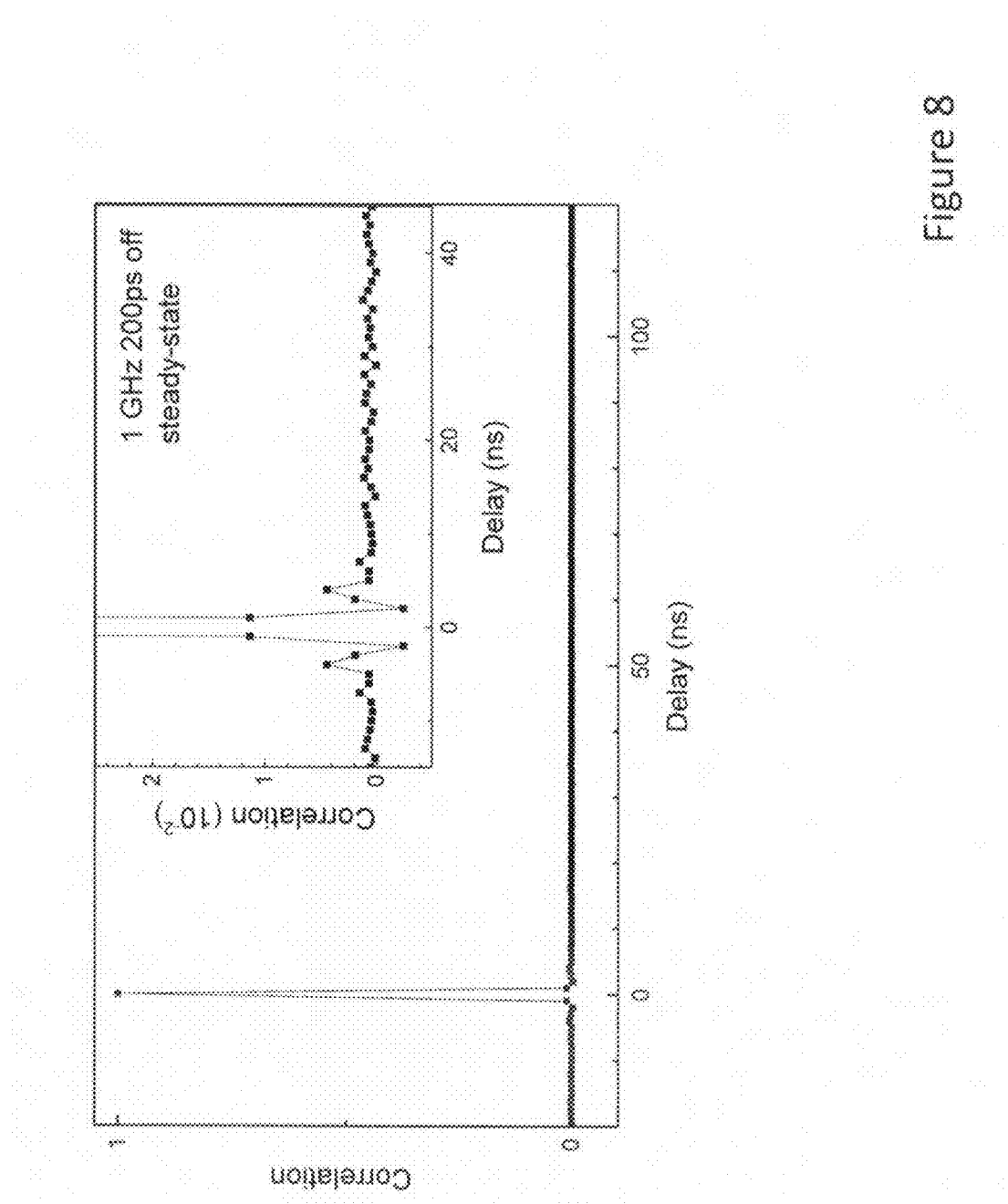
FIG. 8 shows the intensity correlation of the raw data outputted from the ADC in a RNG such as shown in FIG. 1 in which the AMZI is detuned by 200 ps to the 1 GHz laser clock rate.

FIG. 8 shows the intensity correlation of the raw RNG data. This raw data is recorded by the ADC at a sampling rate of 1 GHz in the form of a series of 8-bit integers I(t), where t is time. The intensity correlation is computed using:

$$C(\tau) = \frac{\langle (I(t) - I_0)(I(t+\tau) - I_0) \rangle}{\langle (I(t) - I_0)^2 \rangle},$$

where $I_0$ is the average output intensity, and $\langle \bullet \rangle$ means the statistical average. The intensity correlation from 0 to 1 is the vertical axis. The delay in ns is the horizontal axis. At zero time delay, i.e., $\tau=0$, a correlation value of C=1 is obtained because any data is perfectly correlated with itself. The absolute value, $|C(\tau)| \leq 1$, measures the correlation level between elements with a given delay $\tau$. The inset shows a magnified region around 0 delay. The correlation is very little, illustrating a high quality of random sources.

Figure 9:
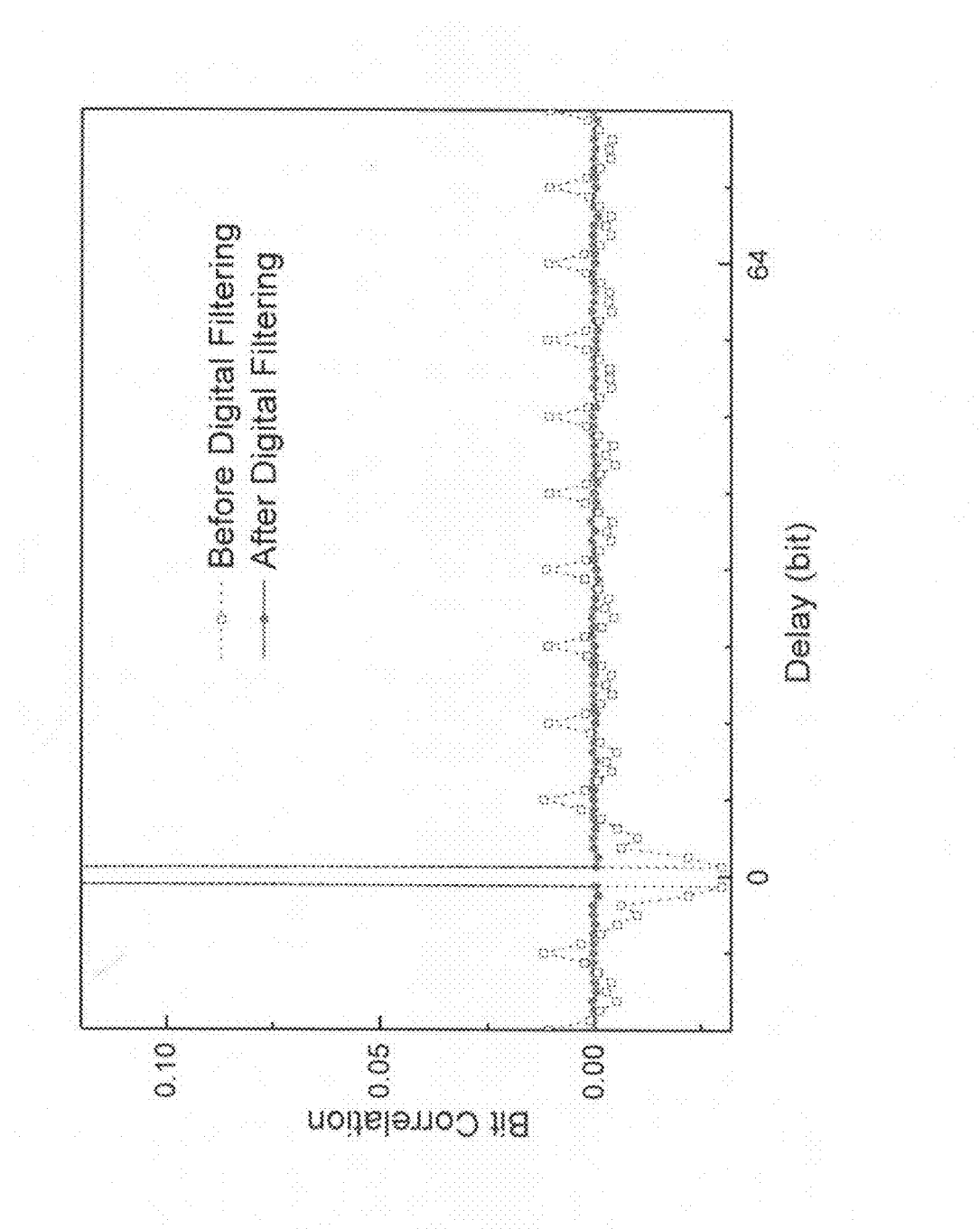
FIG. 9 shows bit correlation before and after filtering for a RNG such as shown in FIG. 1, in which the AMZI is detuned by 200 ps to the 1 GHz laser clock rate.

FIG. 9 shows the bit correlation before and after filtering for a random number generator such as shown in FIG. 1, in which the AMZI 2 is detuned by 200 ps to the 1 GHz laser clock rate. The laser is driven such that each light pulse is generated with a spike-like temporal intensity profile followed by a plateau-like temporal intensity profile. The horizontal axis shows the delay in the unit of bits. The vertical axis shows the bit correlation. The raw data from the RNG is the square data series. The raw data is the ADC output before digital filtering, and comprises 8 bits per sample. The data after digital filtering is the circular point series.

Data is recorded by the ADC at a sampling rate of 1 GHz in the form of a series of 8-bit integers. The RNG raw output comprises 8-bits taken from each ADC sample. For the data taken before digital filtering (i.e. the square data series) the bit correlation is that for the bits outputted directly from the ADC 4. For the data taken after digital filtering (i.e. the circular data series) the bits outputted from the ADC 4 are inputted into a digital filter 5 prior to the correlation being determined. A digital filter of the type described in relation to FIG. 14 can be used.

The value of each bit is b(n), n is a discrete bit index corresponding to the bit number, i.e. for the first outputted bit n=1, for the second outputted bit n=2 etc. Calculation of the bit correlation is similar to calculation of the intensity correlation, but I(t) is replaced with the bit value, i.e. b(n). The bit correlation is computed using:

$$C(\tau) = \frac{\langle (b(n) - b_0)(b(n+\tau) - b_0) \rangle}{\langle (b(n) - b_0)^2 \rangle},$$

where $b_0$ is the average value of the output bits, and $\langle \bullet \rangle$ means the statistical average. Each bit has a value of either 0 or 1, therefore the average value of the output bits is between 0 and 1. The bit correlation from 0 to 1 is the vertical axis. The delay $\tau$ in bits is the horizontal axis. $\tau$ is the number of bits delay. At zero bit delay, i.e., $\tau=0$, a correlation value of C=1 is obtained because any data is perfectly correlated with itself. The absolute value, $|C(\tau)| \leq 1$, measures the correlation level between elements with a given number of bits delay $\tau$.

Bit correlation can exist in the raw RNG bits, and in this case oscillations at a repetition period of 8-bits with a small but statistically significant amplitude of ~0.01 are seen.

The oscillation arises mainly from the imperfect match of the ADC 4 range to the O/E 3 output. For example, when an 8-bit ADC is half filled, the most significant bit will always be zero. This will cause an oscillation with a period of 8-bits. The computed intensity autocorrelation (shown in FIG. 8) does not show any oscillation, which confirms that the correlation stems from the sampling mismatch. For the experimental set up used, the peak to peak signal amplitude of the O/E 3 was slightly less than the range of the ADC 4 (i.e. there is underfilling). However, using different experimental set ups, the peak-peak signal amplitude of the O/E 3 may be larger than the range of the ADC 4. This will also cause oscillation in the bit correlation. A digital filter of the type described in relation to FIG. 14 can also be used to remove this correlation.

The small but statistically significant correlations can be removed by data post-processing. Post-processing can remove bias and/or correlation in the data. Bias here refers to the relative number of each bit value, i.e. if there are an unequal number of 0s and 1s in the data set then the data is biased. Unbiased data would have an equal number of 1s and 0s. For example, if the output of an RNG is a binary pattern of 010101010101010101 . . . , this is unbiased because there is an equal number of 0s and 1s. However, there is a strong correlation in the output, and the correlation C=1 for a bit delay of 2×n bits. Imperfections such as bias or correlations can arise from the light source, or the measurement, or both. Post-processing can be based on un-biasing algorithms, i.e. logical or arithmetic operations applied to raw bits. Data post-processing of this type can be performed using a digital filter. An example of a digital filter is described in relation to FIG. 14.

Figure 10:
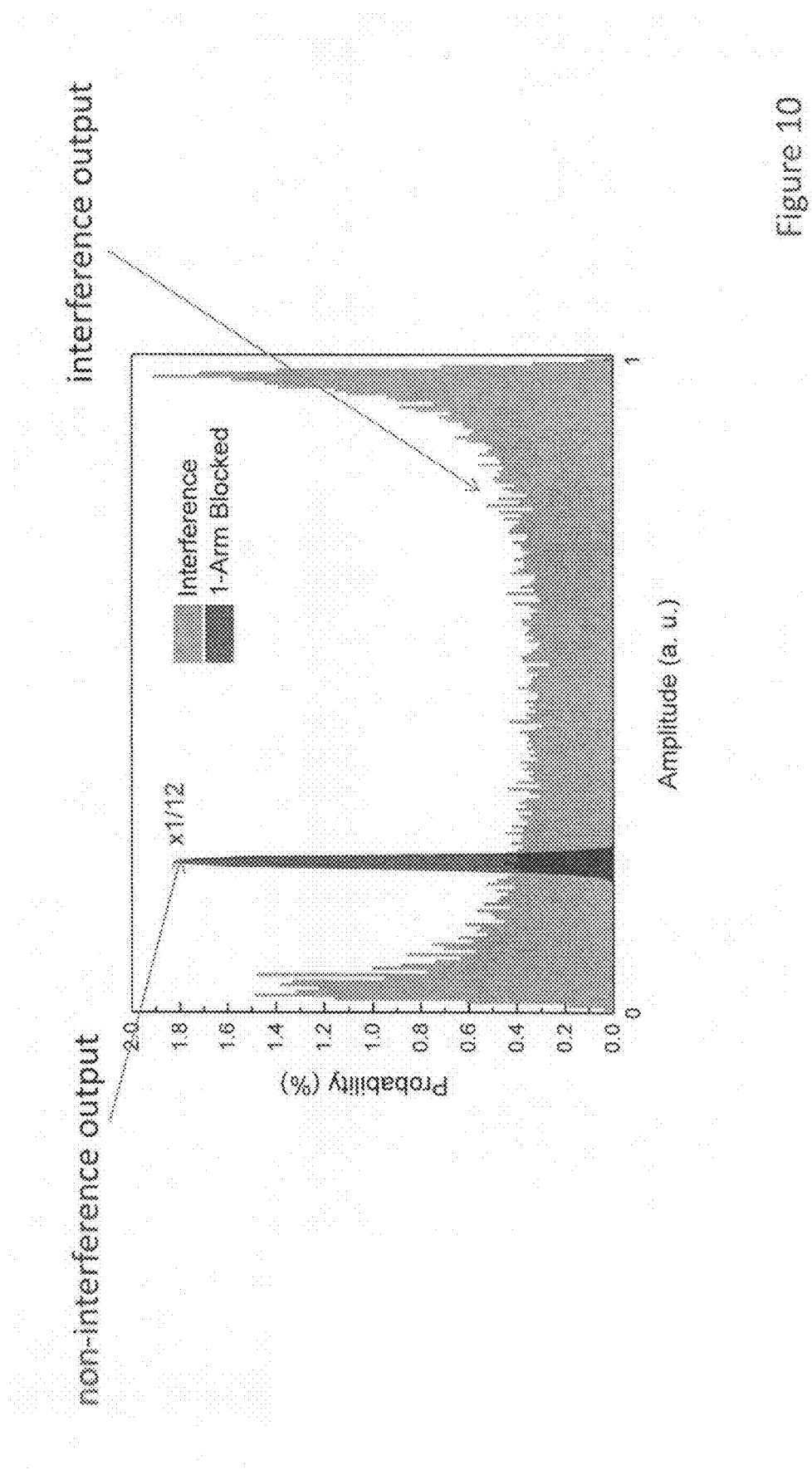
FIG. 10 shows histograms for interference output and non-interference output of an experimental set up such as is shown in FIG. 1.

FIG. 10 shows histograms for interference output and non-interference output of the experimental set up shown in FIG. 1. The horizontal axis shows the amplitude (a.u.) of the signal output from the O/E 3. The vertical axis shows the percentage probability of measuring each amplitude. The non-interference output probability is scaled down by a factor of 12 in order that it can displayed on the same axis more easily. The non-interference output is obtained by disconnecting one arm in the interferometer. The probability of the interference output is large at close to 0 amplitude (corresponding to destructive interference) and close to 1 (corresponding to constructive interference). The non-interference output is shows a probability spike at around 0.25 amplitude.

Figure 11:
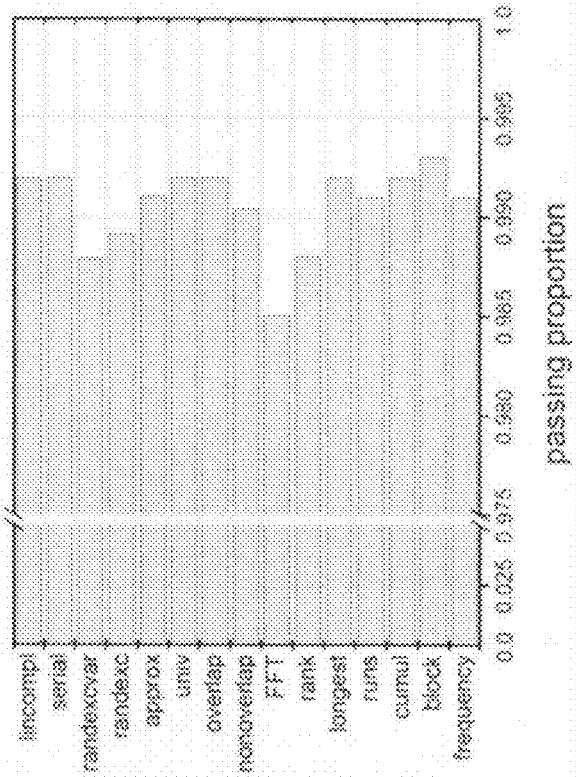
FIG. 11(a) shows the p-values obtained using the National Institute of Standards and Technology (NIST) Special Publication 800-22 Statistical Tests for Random Bits.
FIG. 11(b) shows the proportion of sequences that pass the National Institute of Standards and Technology (NIST) Special Publication 800-22 Statistical Tests for Random Bits.
Figure 11:
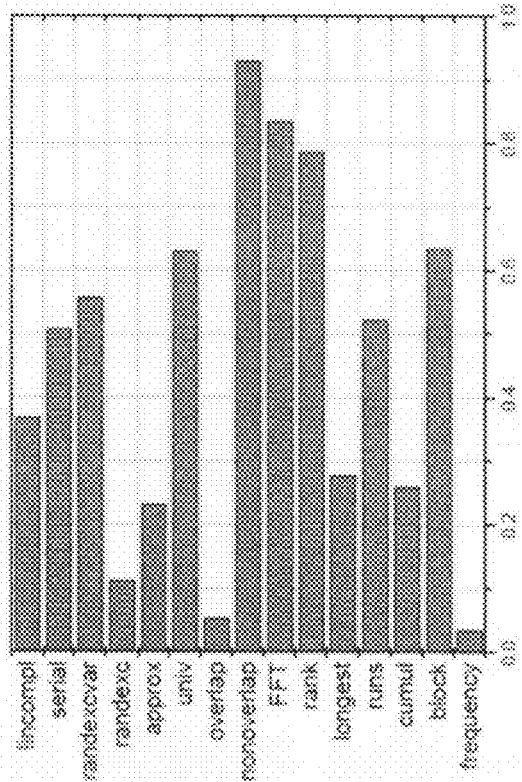

FIG. 11 shows test results obtained using the National Institute of Standards and Technology (NIST) Special Publication 800-22 Statistical Tests for Random Bits. The random numbers are generated using a RNG such as shown in FIG. 1, with a semiconductor gain-switched laser diode. The laser is operated with a 1 GHz clock rate and is driven such that the emitted pulses are generated with a spike-like temporal intensity profile followed by a plateau-like temporal intensity profile. The AMZI is detuned by 200 ps to the laser clock. The RNG comprises an 8-bit ADC and uses digital filtering in which M=2, $c_0=c_2=1$ and $c_1=1$ and k=8. The detail of the filter is described in relation to FIG. 14. A total of 1000×1 Mbits random bit sequences are subjected to the test. 1000×1 Mbits of data are obtained at a rate of 8 Gb/s.

The test suite comprises 15 tests which result in a p-value. FIG. 11(a) shows the p-values obtained. The p-value for each test is defined as "the probability a perfect RNG would have produced a sequence less random than the sequence that was tested, given the kind of non-randomness assessed by the test". A significance level for the p-value of $\alpha=0.01$ is selected. If the p-value is greater than α for a particular test, the test is deemed to have been passed. The P-value, which is the uniformity of the p-values, should be greater than 0.0001.

Since the test is performed on a finite sequence, statistically, some failure probability of passing is expected. A parameter reflecting this probability is given by the proportion of passes. FIG. 11(b) shows the proportion of sequences that pass the test. For the RNG data analysed, the passing proportion should be greater than 0.980.

Table 1 shows the randomness test results of the RNG at various rates of 8 and 20 Gb/s using the NIST test suite. For tests producing multiple P-values, a Kolmogorov-Smirnov [KS] uniformity test has been performed. For multiple proportion values, mean values are displayed. Respective laser characteristic and AMZI detunings are also shown.

TABLE 1

| Laser repetition rate (GHz) | 1 | 2.5 |
| --- | --- | --- |
| Laser mode | steady-state | steady-state |
| AMZI detuning (ps) | 200 | 80 |
| Random bit rate (Gb/s) | 8 | 20 |
| Post-processing | FIR, M = 2, $b_{\{0,1,2\}} = \{1.2, 1\}$ | |
| Residual cavity photons | $<10^{-35}$ | $<10^{-10}$ |
| NIST test | P-value/proportion | |
| Frequency | 0.9558/0.995 | 0.9839/0.990 |
| Block Frequency | 0.6870/0.994 | 0.8862/0.993 |
| Cumulative Sums [KS] | 0.8617/0.992 | 0.6173/0.991 |
| Runs | 0.9558/0.996 | 0.7479/0.985 |
| Longest Run | 0.4136/0.989 | 0.3537/0.992 |
| Rank | 0.0898/0.994 | 0.9756/0.991 |
| FFT | 0.7637/0.994 | 0.7459/0.989 |
| Non Overlapping Template [KS] | 0.2832/0.990 | 0.5180/0.990 |
| Overlapping Template | 0.1728/0.988 | 0.6517/0.989 |
| Universal | 0.6080/0.989 | 0.5914/0.989 |
| Approximate Entropy | 0.8111/0.991 | 0.9473/0.990 |
| Random Excursions [KS] | 0.4676/0.991 | 0.1763/0.990 |
| Random Excursions Variant [KS] | 0.3590/0.998 | 0.0887/0.990 |
| Serial [KS] | 0.5948/0.993 | 0.8344/0.993 |
| Linear Complexity | 0.5382/0.990 | 0.7399/0.989 |
| Result | Success | Success |

As summarised in Table 1, the RNG at 8 Gb/s has passed the statistical test for randomness.

The random bit rate can be increased from 8 Gb/s by clocking the laser at a higher repetition rate. When the laser is driven at 2.5 GHz, the duration of the steady-state emission shrinks, but remains sufficient for operation with 20% detuning in the AMZI, (corresponding to 80 ps). At this clock frequency, an RNG rate of 20 GB/s is obtained.

This bit rate can provide a real time feed to the most demanding applications, including GHz-clocked QKD.

Figure 12:
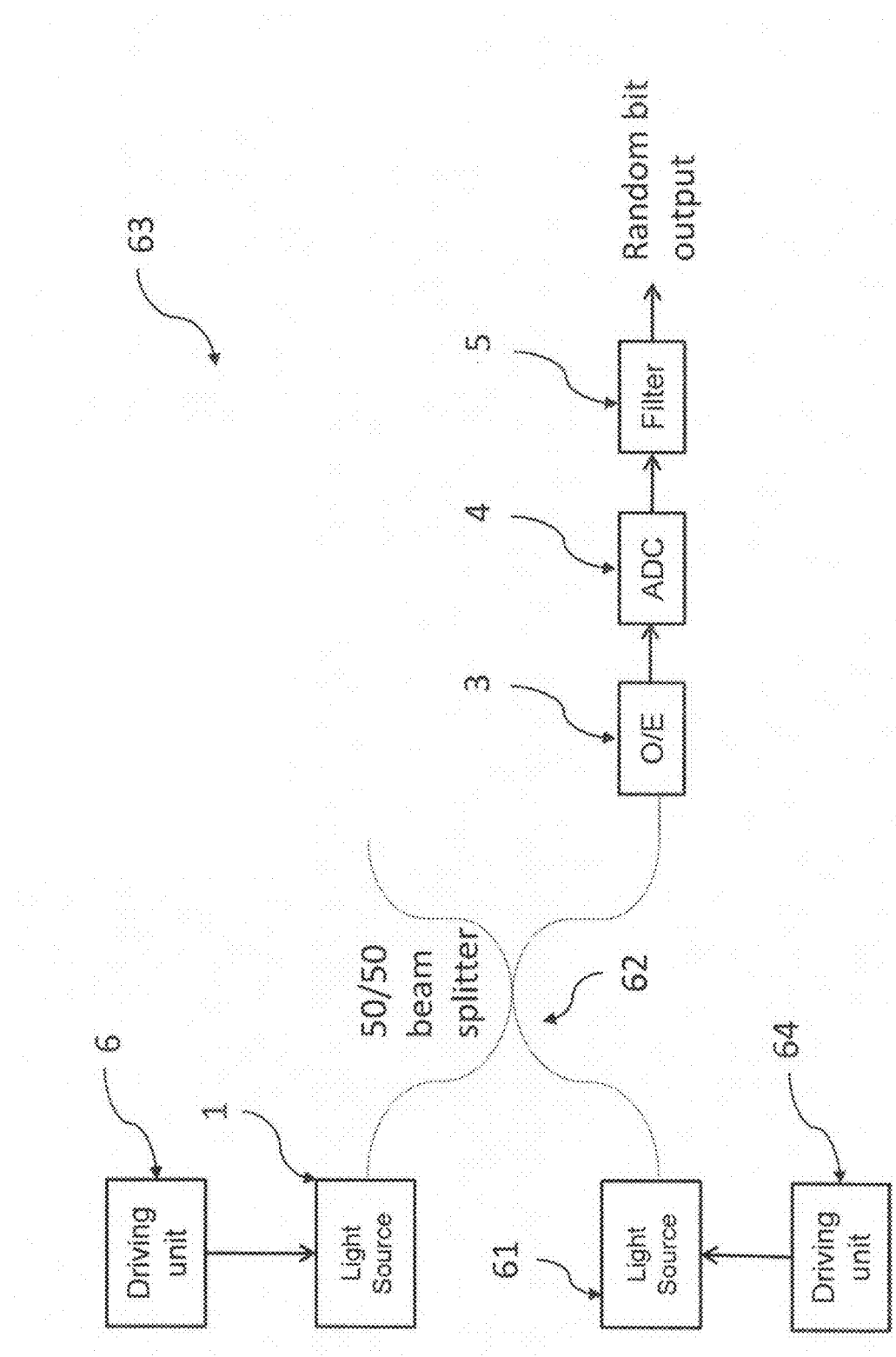
FIG. 12 is a schematic illustration of a RNG in accordance with an embodiment comprising two light sources.

FIG. 12 is a schematic illustration of a random number generator 63 in accordance with another embodiment. The random number generator 63 comprises a first light source 1, which can be, for example, a laser. The driving unit 6 is configured to drive the light source 1 in order to generate pulses with at least two local maxima in the temporal intensity profile. In one embodiment, light source 1 is a gain-switched semiconductor laser diode. The random number generator comprises a second light source 61. The second light source 61 can also be, for example, a laser such as a gain-switched laser. The second light source also comprises a driving unit 64. In one embodiment, the driving unit 64 is configured to drive the light source 61 to generate pulses of light. In one embodiment, the driving unit 64 is configured to drive the second light source 61 such that the pulses of light have a spike-like narrower part and a plateau-like broader part. In one embodiment, the driving unit 64 is configured to drive the second light source 61 such that the pulses of light have only one part, and do not have a plateau-like broader part. In one embodiment, the driving unit 64 is configured to drive the second light source 61 in continuous wave operation.

The light source 1 is connected to a first input of a 50/50 beam splitter 62 and the second light source 61 is connected to a second input of the 50/50 beam splitter 62. The components can be connected by a waveguide, for example an optical fibre. Alternatively, the random number generator 63 is constructed using micro-optics, and the light pulses travel between the components of the random number generator 63 through free space, meaning that no waveguides are required to connect the components. Alternatively, the random number generator 63 can be integrated onto a single photonic chip, for which the waveguides between the components are part of the photonic chip and are not optical fibres.

One output of the 50/50 beam splitter 62 is connected to an O/E 3. The O/E 3 can be, for example, a semiconductor photodiode or a semiconductor avalanche photodiode. In alternative embodiments, the light source 1 and O/E 3 are provided by a single module, for example, a telecom transceiver such as a small-form-pluggable module (SFP). SFPs are inexpensive telecom components. The second laser, i.e. light source 61, can be incorporated into the same SFP module as light source 1.

The output of the O/E 3 is connected to an ADC 4. The O/E 3, ADC 4 and filter 5 are the same as described in relation to FIG. 1.

Light source 1 is driven by driving unit 6 to generate and emit light pulses. Light pulses emitted from the light source 1 are directed into the first input of 50/50 beam splitter 62. Light source 61 is driven by driving unit 64 to generate and emit light. Light emitted from light source 61 is directed into the second input of 50/50 beam splitter 62. The emission of the light pulses is timed such that a light pulse emitted from light source 1 and light emitted from light source 61 interfere at the 50/50 beam splitter 62. Light pulses emitted by light source 1 and light emitted by light source 61 may have comparable intensities when meeting at the 50/50 beam splitter 62 in order to ensure high visibility interference. In one embodiment, the intensity difference can be controlled to within 3 dB by the driving conditions. In one embodiment, the intensity of light from the two light sources at the output beam splitter is the same to within 3 dB.

The intensity of the light detected by the O/E 3 connected to one output of the 50/50 beam splitter 62 depends on the phase difference between the light pulse from light source 1 and the light from light source 61 (which is random). Therefore, for each interference, a random intensity is measured at the O/E 3 at one output of the output beam splitter. For example, a phase difference of 0 at the 50/50 beam splitter 62 leads to constructive interference, and a maximum intensity is measured at the photodiode. If, on the other hand, there is a phase difference of $\pi$, destructive interference occurs at the output beam splitter and a minimum intensity is measured. For any other value there will be an intermediate intensity measured at the photodiode. When both light sources are driven to emit light pulses with a spike-like temporal intensity profile followed by a plateau-like temporal intensity profile, the output of the O/E 3 is the same as for the random number generator 10 shown in FIG. 1 when the light source is driven to emit light pulses with a spike-like temporal intensity profile followed by a plateau-like temporal intensity profile.

In this embodiment, instead of interfering consecutive (or any subsequent) light pulses from the same laser diode, a second laser is introduced and interference takes place between light emitted from two independent laser diodes. The driving units can be synchronised such that a light pulse emitted from one laser diode and a light pulse emitted from the other laser diode interfere at the 50/50 beam splitter 62. The light pulses need not have been emitted from the laser diodes at the same time in order to interfere at the 50/50 beam splitter 62. The timing may depend on the optical path length of each light source to the 50/50 output beam splitter 62.

Figure 13:
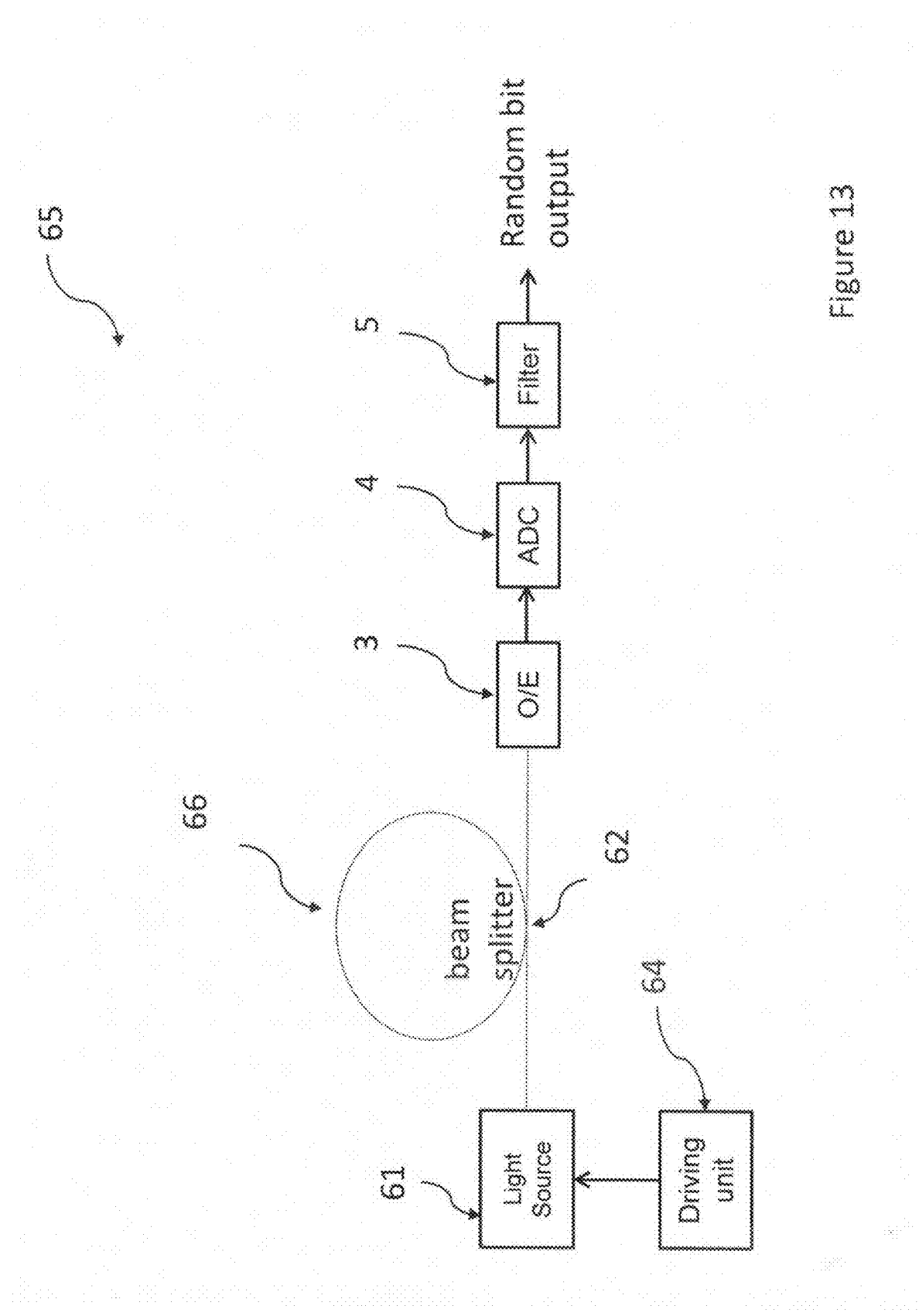
FIG. 13 is a schematic illustration of a RNG in accordance with an embodiment comprising a fibre optical ring resonator.

FIG. 13 is a schematic illustration of a random number generator 65 in accordance with another embodiment. The random number generator 65 comprises a fibre optical ring resonator 66, which is formed by connecting one input and one output of the same fibre optical beam splitter 62. In the RNG 65, the beam splitter 62 is a fibre optical beam splitter. A first input of the beam splitter 62 is connected to a first output of the beam splitter 62 via a fibre connector or splicing, forming a continuous ring.

The random number generator 63 comprises a first light source 61, which can be, for example, a laser. The driving unit 64 is configured to drive the light source 61 in order to generate pulses of light with at least two local maxima in the temporal intensity profile. In one embodiment, light source 61 is a gain-switched semiconductor laser diode.

The light source 61 is connected to the second remaining input of the beam splitter 62. The first input of the beam splitter 62 is connected to the first output of the beam splitter by a fibre optic cable. The beam splitter 62 and the fibre optic cable form a ring resonator 66.

The components of the RNG 65 can be connected by a waveguide, for example an optical fibre. Alternatively, the random number generator 63 is constructed using micro-optics, and the light pulses travel between the components of the random number generator 63 through free space, meaning that no waveguides are required to connect the components. Alternatively, the random number generator 63 can be integrated onto a single photonic chip, for which the waveguides between the components are part of the photonic chip and are not optical fibres.

The second remaining output of the beam splitter 62 in the ring resonator 65 is connected to an O/E 3. The O/E 3 can be, for example, a semiconductor photodiode or a semiconductor avalanche photodiode. In alternative embodiments, the light source 1 and O/E 3 are provided by a single module, for example, a telecom transceiver such as a small-form-pluggable module (SFP). SFPs are inexpensive telecom components.

The output of the O/E 3 is connected to an ADC 4. The O/E 3, ADC 4 and filter 5 are the same as described in relation to FIG. 1.

Light source 61 is driven by driving unit 6 to generate and emit light pulses. Light pulses emitted from the light source 61 are directed into the second input of the beam splitter 62 of the ring resonator 66. Light source 61 is driven by driving unit 64 to generate and emit light.

At the beam splitter 62, the input light pulse interferes with photons cycling in the ring. The interference will direct part of the optical energy, including both the stored photons and the newly input pulse, into the ring resonator output. The remaining photons will be recycled from the first output of the beam splitter 62 to the first input of the beam splitter 62 to interfere with the next input light pulse.

If the length of the fibre optic cable that forms the ring corresponds to one clock period of the light source 61, the recycling pulse will temporally overlap with the next input pulse emitted from the light source 61 entering through the second input of the beam splitter 62. The interference directs some of the light to exit the beam splitter 62 through the second output and the intensity is measured at the O/E 3. The rest of the light exits the beam splitter 62 through the first output, and travels through the fibre optic ring. The second part of the light will then interfere with the third light pulse emitted from the light source 61 when it enters through the second input of the beam splitter 62.

The length of the fibre ring should be set to match the clock period (or an integer multiple thereof) of the laser to within 20% of the clock period. In one embodiment, the optical path length of the ring results in a delay that is an integer multiple of the clock period to within 20% of the clock period. The value of the optical path length of the ring may also take account of the optical path length of the light source to the beam splitter 62. In one embodiment, the splitting ratio of the output to the ring to the output to the O/E 3 of the beam splitter 62 in the ring resonator 66 is between 20/80 and 80/20.

The intensity of the light detected by the O/E 3 connected to one output of the beam splitter 62 depends on the phase difference between the light pulse from the ring and the light pulse from light source 61 (which is random). The intensity of the light pulses cycling the ring is not constant. The intensity of light detected by the O/E depends on both the intensity of the interfering light pulse from the ring and the electromagnetic phase difference between the new input pulse and the interfering pulse from the ring. Therefore, for each pair of interfering pulses, a random intensity is measured at the O/E 3 at one output of the output beam splitter. When the light source is driven to emit light pulses with a spike-like temporal intensity profile followed by a plateau-like temporal intensity profile, the output of the O/E 3 is the same as for the random number generator 10 shown in FIG. 1.

In this embodiment, consecutive (or any subsequent) light pulses from the same laser diode are interfered using a ring resonator. Part of each light pulse entering the beam splitter travels the fibre optic ring, and re-enters the beam splitter 62 to interfere with a subsequently emitted light pulse. Subsequent light pulses emitted from one laser diode therefore interfere at the beam splitter 62.

Figure 14:
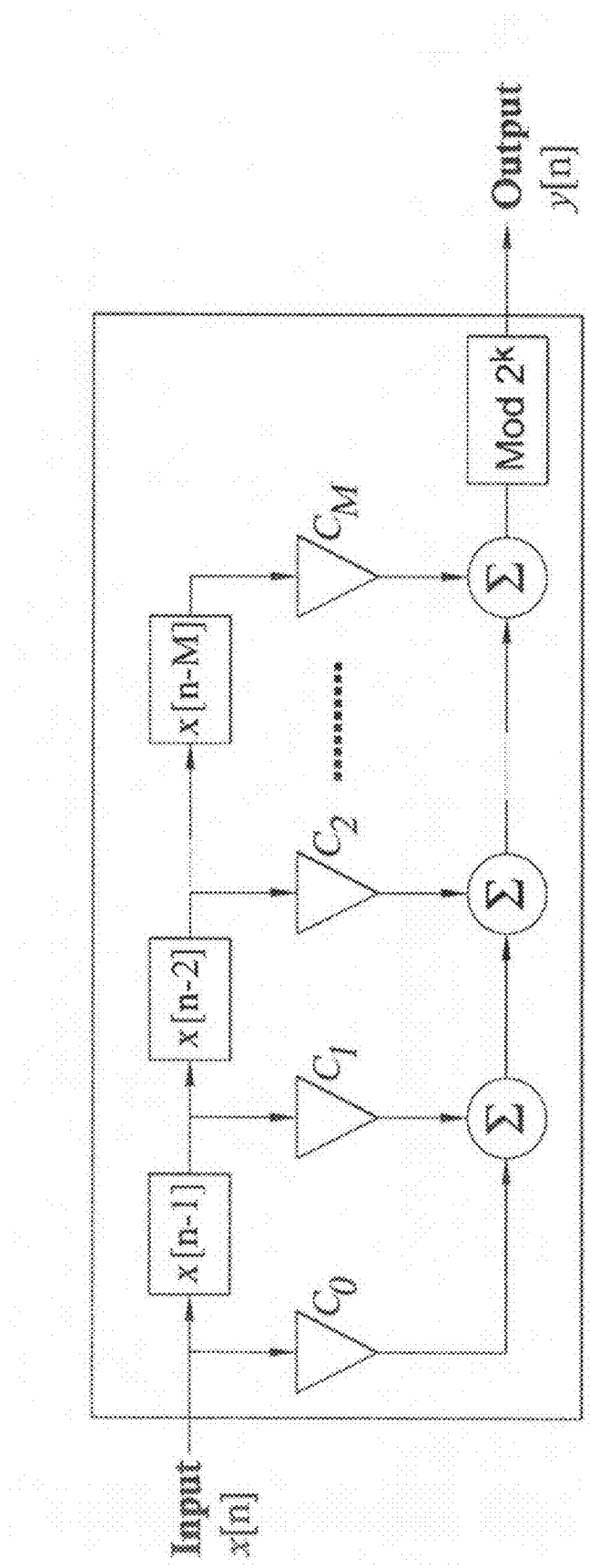
FIG. 14 is a schematic illustration of a digital filter that can be used in a RNG in accordance with an embodiment.

An example of a digital filter is described in relation to FIG. 14. The digital filter described in relation to FIG. 14 can be used as the digital filter 5 in a RNG such as described in relation to FIGS. 1, 12 and 13. The digital filter performs data-post processing on the output of the ADC 4. Alternatively, data post-processing can be based on an approach that starts from a theoretical framework to model a realistic quantum NRG to quantify the contribution to randomness from the quantum mechanical effect. This approach is rigorous, but requires special randomness extractors, whose speed may not match that of an ultrafast RNG. In alternative embodiments, data post-processing is not used, and the output of the ADC 4 is the output of the RNG 10.

A filter such as described in relation to FIG. 14 can also be used in other types of random number generators, for example a random number generator based on chaotic lasers, or semiconductor thermal noise. A filter such as described in relation to FIG. 14 can also be used in other applications, for example other digital signal processing applications.

A random number generator in accordance with an embodiment may comprise two functional parts, a noise source generator and an unbiasing process. In one embodiment, the random number generator comprises a digital filter which performs the unbiasing process. FIG. 14 is a schematic illustration of such a digital filter. The digital filter shown in FIG. 14 can be implemented using standard digital electronics, such as field-programmable gated arrays (FPGAs) or application specific integrated circuits (ASICs). The filter is a finite impulse response (FIR) filter. It operates the mathematical transformation:

$$y[n] = \sum_{i=0}^{M} c_i x[n-i] \bmod 2^k$$

where $M \geq 1$ and is an integer, $x[n]$ is the nth input, i.e. the nth output from the ADC output, and $y[n]$ is the corresponding nth output. The filter converts the RNG raw output, i.e. a stream of 8-bit integers $x[n]$, into $y[n]$. Each output depends on the previous M inputs. The coefficients $c_i$ can be any real number. For easy implementation, the $c_i$ are chosen as integers.

The value of k is related to a compression or expansion factor. It can be compared to the bit depth of the ADC, for example the value of k can be chosen to be equal to the bit depth such that if the bit depth of the ADC is 8 bits, then k is 8. Alternatively, any value of k less than the bit depth can be used. For example, where the ADC is an 8-bit ADC each output will have a form $b_0 b_1 b_2 b_3 b_4 b_5 b_6 b_7$, where the bs represent the 8 bits of a single ADC output. All 8 bits can be used as the input, i.e. $x[n]=b_0 b_1 b_2 b_3 b_4 b_5 b_6 b_7$. Alternatively, a subset of the 8 bits can be used as the input, for example, the middle four bits can be used ach sample, $x[n]=b_2 b_3 b_4 b_5$. The number of bits of the output $y[n]$ is k. The value of k must not be larger than the bit length of the input. The mod $2^k$ operation takes the least significant k bits as the filter output. Other choices of bit can also be used. For example, the most significant k-bits can be used.

In one embodiment, a simple filter using only two input samples, i.e. $M=1$ and using $c_0=c_1=1$ is used to filter the raw output data from the ADC. The output of the filter, $y[n]$ is:

$$y[n]=(x[n]+x[n-1]) \bmod 2^k$$

This filter is a neighbouring averaging filter. Simple filters such as described above can be cascaded to form a single, more sophisticated filter.

In one embodiment, a digital filter of the form $$y[n]=(x[n]2x[n-1]+x[n-2]) \bmod 2^k$$

is used. This filter is used to filter the raw data. The solid circle data series "After digital filtering" shown in FIG. 9 is $y[n]$, the output of this filter, when applied to the raw data series shown in FIG. 9 by the hollow square points. This filter is a cascade of two averaging functions. In the example for this data, k is taken to be 8, meaning that the output has equal bit length to the input. As can be seen in FIG. 9, the periodic correlation is removed in the filtered output. The FIR effectively removes the bit correlations, as shown in FIG. 9, with the residual correlation being well within statistical fluctuation.

In one embodiment, a digital filter of the form $$y[n] = \sum_{i=0}^{M} \frac{M!}{i!(M-i)!} x[n-i] \bmod 2^k$$

is used to process the raw output data from the ADC. In this embodiment, the filter is simply an Mth order addition of neighbouring elements. The operation fuses bits of differing significances, thus achieving de-correlation of the raw data.

Other coefficients can also be chosen. For example, arbitrary sign can be chosen for each $c_i$ as the interference output is intrinsically non-deterministic. In other words, the sign for each $c_i$ can be chosen at random.

In one embodiment, the derivative method is used to process the raw output data from the ADC, and the digital filter has the form $$y[n] = \sum_{i=0}^{M} (-1)^i \frac{M!}{i!(M-i)!} x[n-i] \mathrm{mod} 2^k$$

The minimum value of M depends on how closely the O/E matches the ADC range. As the interference produces full swing in intensity, M=2 can be sufficient for de-correlation in some cases when the O/E output approximately matches the ADC range.

RNGs such as described in relation to FIGS. 1, 12 and 13 are robust interferometric RNGs that tolerate large temporal detuning of the interfering laser pulses. An RNG comprising an 8 bit digitizer followed by a FIR unbiasing algorithm has been shown to achieve random number generation rates of 8 and 20 Gb/s for laser repetition rates of 1 and 2.5 GHz respectively. A RNG comprising a simple FIR filtering technique is demonstrated to pass the statistical tests for randomness at a bit rate of up to 20 GB/s.

The RNGs described comprise at least one light source. Different driving conditions for the light source have a critical influence on the interference properties. In the RNG described in relation to FIG. 1, the intensity measured at the O/E 3 is dependent on the interference of consecutive (or any subsequent) light pulses inside the AMZI 2. High intensity corresponds to constructive interference. Low intensity corresponds to destructive interference. The AMZI differential delay is tuned to match the laser clock frequency, to within a tolerance of 20% of the clock period. The ADC 4 is synchronized to digitize the interference output signal, for example at a sampling rate of 1 GHz. When the light source is driven to generate light pulses with at least two local maximum, one of which is associated with a spike-like intensity feature and one of which is associated with a plateau-like intensity feature, high quality interference occurs. When the interference quality is high then the intensity measured at the O/E is due to the random phasing of the optical pulses.

The intensity measured at the O/E varies over a full range between a maximum value, corresponding to constructive interference, and a minimum value corresponding to destructive interference.

The interference may depend on the properties of the laser emission, such as the time jitter ($\tau$) and the frequency chirp ($\beta$). Frequency chirp may prevent a common phase difference between interfering pulses where there is a certain arrival time difference $\Delta t$. This time difference may arise from the laser time jitter or the systematic misalignment in the AMZI. The phase difference evolves as $\Delta\varphi=\beta\Delta t\cdot t$ throughout the temporal overlap. In an extreme case that such phase evolves more than $2\pi$, part of the pulses undergoes constructive interference while another part undergoes destructive interference, thus deteriorating the overall interference. To achieve good interference, either the frequency chirp ($\beta$) or the temporal misalignment ($\Delta t$) should be small. In general, the greater the phase evolution, the more the interference is deteriorated. When two pulses are aligned temporally, i.e. when they arrive at the same time such that $\Delta t=0$, complete constructive or destructive interference can take place.

However, when the driving conditions are such that the light pulses are emitted with a spike-like temporal intensity profile followed by a plateau-like temporal intensity profile then the frequency chirp is negligible ($\beta\approx 0$). With negligible frequency chirp, pulses always undergo identical phase evolution (i.e. the phase difference does not change over the temporal overlap such that $\Delta\varphi=0$). Complete interference is possible even when $\Delta t\neq 0$.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. A random number generation system, comprising:
   a light source configured to generate light pulses;
   a driving unit configured to drive said light source by applying a time varying signal comprising a series of pulses to the light source, wherein when applied to the light source each pulse in the time varying signal generates a light pulse, the frequency of the pulses being less than or equal to 4.0 GHz such that the phase of each light pulse has a random relationship to the phase of each subsequently generated light pulse, and such that each light pulse is generated with at least two local maxima in the temporal intensity profile, wherein each light pulse is generated with a spike-like temporal intensity profile followed by a plateau-like temporal intensity profile, wherein a first local maxima is associated with the part of the light pulse with a spike-like temporal profile and a second local maxima is associated with the part of the light pulse with a plateau-like temporal intensity profile;
   an interference module, configured to interfere input light pulses, wherein the generated light pulses having at least two local maxima in the temporal intensity profile are inputted to the interference module, said interference module configured to transform the random phase of said input light pulses into a random amplitude of an output light pulse by interference of the input light pulses; and
   an optical electrical signal converter and an analogue to digital converter configured to generate a sequence of N-bit random integers from the random amplitudes of a sequence of output light pulses.

2. The random number generation system of claim 1, wherein the intensity of the part of the light pulse with a plateau-like temporal intensity profile does not vary by more than 20%.

3. The random number generation system of claim 1, wherein the part of the light pulse with a plateau-like temporal intensity profile has a longer duration than the part of the light pulse with a spike-like temporal intensity profile.

4. The random number generation system of claim 1, wherein the part of the light pulse with a plateau-like temporal intensity profile has a sharper wavelength distribution than the part of the light pulse with a spike-like temporal intensity profile.

5. The random number generation system of claim 1, wherein said light source is a laser and said driving unit applies a time varying driving signal to said laser.

6. The random number generation system of claim 5, wherein the driving signal is a time varying voltage or current and the amplitude of the maximum voltage or current is at least 25% greater than the voltage or current required to reach the lasing threshold when operating under a DC voltage or current only.

7. The random number generation system of claim 5, wherein the driving signal pulses have a substantially flat-topped profile.

8. The random number generation system of claim 1, wherein said interference module comprises:
a fibre optical ring resonator.

9. The random number generation system of claim 1, wherein the optical electrical signal converter is a photo-diode.

10. The random number generation system of claim 1, further comprising a finite impulse response filter configured to reduce bias and/or correlations in the output of the analogue to digital converter.

11. The light source unit of claim 10, wherein the output of said finite impulse response filter is $$y[n] = \sum_{i=0}^{M} c_i x[n-i] \mod 2^k$$

where x[n] is the nth output of the analogue to digital converter, $M \geq 1$ and is an integer selected by the user and gives the number of input samples, $k \geq 1$ and is an integer selected by the user and gives the number of bits of the output y[n], and the $c_i$ values are real constants selected by the user.

12. The random number generation system of claim 1, wherein the light source is a semiconductor laser diode that is pulse driven.

13. The random number generation system of claim 1, wherein said interference module comprises:
an asymmetrical Mach-Zehnder interferometer.

14. The random number generation system of claim 13, wherein an optical path length difference between a first arm and a second arm of the asymmetrical Mach-Zehnder interferometer corresponds to an integer multiple of the time between emission of the light pulses to within a tolerance of 20% of the time between emission of the light pulses.

15. A method of random number generation, comprising:
applying a time varying driving signal comprising a series of pulses to a light source, wherein when applied to the light source each pulse in the time varying signal generates a light pulse, the frequency of the pulses being less than or equal to 4.0 GHz such that the phase of each light pulse has a random relationship to the phase of each subsequently generated light pulse and such that each light pulse is generated with at least two local maxima in the temporal intensity profile, wherein each light pulse is generated with a spike-like temporal intensity profile followed by a plateau-like temporal intensity profile, wherein a first local maxima is associated with the part of the light pulse with a spike-like temporal profile and a second local maxima is associated with the part of the light pulse with a plateau-like temporal intensity profile;
inputting the light pulses into an interference module;
interfering said light pulses having at least two local maxima in the temporal intensity profile at the interference module, such that the random phase of said light pulses is transformed into a random amplitude of an output light pulse; and
generating a sequence of N-bit random integers from the random amplitudes of a sequence of output light pulses.

* * * * *